(12) United States Patent
Chen et al.

(10) Patent No.: US 12,461,177 B2
(45) Date of Patent: Nov. 4, 2025

(54) FLEXIBLE RADIO FREQUENCY COIL APPARATUS AND METHODS FOR MAGNETIC RESONANCE IMAGING

(71) Applicant: Hyperfine Operations, Inc., Guilford, CT (US)

(72) Inventors: Gang Chen, Guilford, CT (US); Anne Michele Nelson, Guilford, CT (US)

(73) Assignee: Hyperfine Operations, Inc., Guilford, CT (US)

( * ) Notice: Subject to any disclaimer, the term of this patent is extended or adjusted under 35 U.S.C. 154(b) by 140 days.

(21) Appl. No.: 18/353,025

(22) Filed: Jul. 14, 2023

(65) Prior Publication Data

US 2023/0366958 A1    Nov. 16, 2023

Related U.S. Application Data

(63) Continuation of application No. PCT/US2022/012496, filed on Jan. 14, 2022.
(Continued)

(51) Int. Cl.
*G01R 33/44* (2006.01)
*A61B 5/055* (2006.01)
(Continued)

(52) U.S. Cl.
CPC ............ *G01R 33/445* (2013.01); *A61B 5/055* (2013.01); *G01R 33/34046* (2013.01); *G01R 33/34084* (2013.01); *G01R 33/3415* (2013.01)

(58) Field of Classification Search
CPC ............ G01R 33/445; G01R 33/34046; G01R 33/34084; G01R 33/3415; G01R 33/34007; G01R 33/36; A61B 5/055
See application file for complete search history.

(56) References Cited

U.S. PATENT DOCUMENTS

| 4,766,378 A | 8/1988 | Danby et al. |
| 5,057,777 A | 10/1991 | Kurczewski |
| (Continued) | | |

FOREIGN PATENT DOCUMENTS

| CN | 103645451 A | 3/2014 |
| CN | 103744041 B | 4/2014 |
| (Continued) | | |

OTHER PUBLICATIONS

Extended European Search Report for EP App. No. 22740132.0 dated Nov. 4, 2024 (9 pages).
(Continued)

*Primary Examiner* — G. M. A Hyder
(74) *Attorney, Agent, or Firm* — Foley & Lardner LLP

(57) ABSTRACT

A radio frequency apparatus is described herein for facilitating imaging of a patient positioned within a magnetic resonance imaging system comprising a $B_0$ magnet. The radio frequency apparatus may be configured to detect magnetic resonance signals emitted from anatomy of a patient when positioned within a low-field magnetic resonance imaging system, the radio frequency apparatus comprising a flexible substrate capable of being positioned about the anatomy of the patient and a plurality of radio frequency coils coupled to the flexible substrate, each of the plurality of radio frequency coils forming a plurality of turns.

17 Claims, 28 Drawing Sheets

Related U.S. Application Data

(60) Provisional application No. 63/137,925, filed on Jan. 15, 2021.

(51) Int. Cl.
*G01R 33/34* (2006.01)
*G01R 33/3415* (2006.01)

(56) References Cited

U.S. PATENT DOCUMENTS

| | | |
|---|---|---|
| 5,483,159 A | 1/1996 | Van Heelsbergen |
| 5,600,245 A | 2/1997 | Yamamoto et al. |
| 6,060,882 A | 5/2000 | Doty |
| 6,420,871 B1 | 7/2002 | Wong et al. |
| 6,700,376 B2 | 3/2004 | Goto et al. |
| 6,707,301 B2 | 3/2004 | Goto |
| 6,744,252 B2 | 6/2004 | Goto |
| 7,463,031 B2 | 12/2008 | Kato |
| 7,663,367 B2 | 2/2010 | Wiggins |
| 7,804,300 B2 | 9/2010 | Possanzini |
| 7,834,630 B2 | 11/2010 | Damadian et al. |
| 8,704,520 B2 | 4/2014 | Saha et al. |
| 8,816,687 B2 | 8/2014 | Takamori |
| 9,545,218 B2 | 1/2017 | Ota et al. |
| 9,696,393 B2 | 7/2017 | Arias et al. |
| 10,527,689 B2 | 1/2020 | Rosen et al. |
| 10,627,464 B2 | 4/2020 | Dyvorne et al. |
| 10,794,974 B2 | 10/2020 | Hugon et al. |
| 10,827,948 B1 | 11/2020 | Tramm et al. |
| 10,912,517 B2 | 2/2021 | Poole et al. |
| 11,039,787 B2 | 6/2021 | Jones |
| 11,143,723 B2 | 10/2021 | Brown |
| 2002/0079996 A1 | 6/2002 | Zhang et al. |
| 2002/0145428 A1 | 10/2002 | Nistler et al. |
| 2002/0180439 A1 | 12/2002 | Lee |
| 2003/0122546 A1 | 7/2003 | Leussler |
| 2005/0062472 A1 | 3/2005 | Bottomley |
| 2005/0248347 A1 | 11/2005 | Damadian |
| 2005/0253582 A1* | 11/2005 | Giaquinto .......... G01R 33/3415 324/318 |
| 2006/0055406 A1 | 3/2006 | Lvovsky et al. |
| 2006/0132134 A1 | 6/2006 | Amm et al. |
| 2006/0267586 A1 | 11/2006 | Okamoto et al. |
| 2007/0159170 A1 | 7/2007 | Freytag et al. |
| 2008/0007250 A1 | 1/2008 | Wiggins |
| 2008/0204021 A1* | 8/2008 | Leussler .......... G01R 33/3415 324/318 |
| 2008/0238424 A1 | 10/2008 | Possanzini |
| 2008/0284435 A1 | 11/2008 | Overweg et al. |
| 2009/0121715 A1 | 5/2009 | Guan et al. |
| 2009/0261828 A1 | 10/2009 | Nordmeyer-Massner et al. |
| 2010/0013418 A1 | 1/2010 | Kruip et al. |
| 2010/0305427 A1 | 12/2010 | Huber et al. |
| 2010/0315085 A1 | 12/2010 | Brown et al. |
| 2011/0026801 A1 | 2/2011 | Dohata et al. |
| 2011/0031970 A1 | 2/2011 | Ninomiya et al. |
| 2011/0121830 A1 | 5/2011 | Ma et al. |
| 2011/0273177 A1 | 11/2011 | McGinley et al. |
| 2012/0161767 A1 | 6/2012 | Hardy et al. |
| 2012/0161768 A1 | 6/2012 | Hardy et al. |
| 2012/0286921 A1 | 11/2012 | Wang et al. |
| 2013/0093425 A1 | 4/2013 | Chu et al. |
| 2013/0137969 A1 | 5/2013 | Jones |
| 2013/0320981 A1 | 12/2013 | Bulumulla et al. |
| 2013/0320982 A1 | 12/2013 | Bulumulla et al. |
| 2014/0091791 A1 | 4/2014 | Bulumulla et al. |
| 2014/0210466 A1 | 7/2014 | Arias et al. |
| 2014/0218033 A1 | 8/2014 | Ryu et al. |
| 2014/0263017 A1 | 9/2014 | Jones et al. |
| 2015/0005618 A1 | 1/2015 | Dumoulin |
| 2015/0008923 A1 | 1/2015 | Ando |
| 2015/0226817 A1 | 8/2015 | Pourrahimi |
| 2015/0323628 A1 | 11/2015 | Wald et al. |
| 2015/0355297 A1 | 12/2015 | Menon et al. |
| 2017/0074956 A1 | 3/2017 | Rosen et al. |
| 2017/0343625 A1 | 11/2017 | Chu et al. |
| 2018/0070852 A1 | 3/2018 | Azulay et al. |
| 2018/0136293 A1 | 5/2018 | Xie et al. |
| 2018/0149718 A1 | 5/2018 | Guo et al. |
| 2018/0263561 A1 | 9/2018 | Jones |
| 2019/0154775 A1 | 5/2019 | Stack et al. |
| 2019/0219648 A1 | 7/2019 | Lin et al. |
| 2019/0277926 A1 | 9/2019 | Stormont et al. |
| 2019/0293738 A1 | 9/2019 | Popescu |
| 2019/0310329 A1 | 10/2019 | Malik et al. |
| 2019/0310330 A1* | 10/2019 | Yang ............... G01R 33/34084 |
| 2019/0353722 A1 | 11/2019 | Stormont et al. |
| 2019/0353726 A1 | 11/2019 | Poole et al. |
| 2020/0022613 A1 | 1/2020 | Nelson et al. |
| 2020/0081082 A1 | 3/2020 | Kundner et al. |
| 2020/0093394 A1 | 3/2020 | Li et al. |
| 2020/0158800 A1 | 5/2020 | Taracila et al. |
| 2020/0271738 A1 | 8/2020 | Qin et al. |
| 2020/0309876 A1 | 10/2020 | Robb et al. |
| 2020/0355761 A1 | 11/2020 | McNulty et al. |
| 2020/0408860 A1 | 12/2020 | Taracila et al. |
| 2021/0173027 A1 | 6/2021 | Hugon et al. |
| 2021/0293915 A1 | 9/2021 | Fenchel et al. |
| 2021/0356541 A1 | 11/2021 | Guan et al. |
| 2021/0369133 A1 | 12/2021 | Coppens et al. |
| 2022/0229132 A1 | 7/2022 | Chen et al. |
| 2022/0354378 A1 | 11/2022 | Nacev et al. |
| 2024/0168105 A1 | 5/2024 | Inglis et al. |

FOREIGN PATENT DOCUMENTS

| | | |
|---|---|---|
| CN | 106291422 A | 1/2017 |
| CN | 207051471 U | 2/2018 |
| CN | 208864328 U | 5/2019 |
| CN | 212207645 U | 12/2020 |
| JP | 1119061 A | 1/1999 |
| WO | WO-2023/049506 A1 | 3/2023 |

OTHER PUBLICATIONS

Extended European Search Report for EP App. No. 22740137.9 dated Nov. 7, 2024 (10 pages).
International Search Report and Written Opinion for PCT Appl. No. PCT/US2022/012486, mailed May 4, 2022 (10 pages).
International Search Report and Written Opinion for PCT Appl. No. PCT/US2022/012496, mailed Apr. 28, 2022 (11 pages).

* cited by examiner

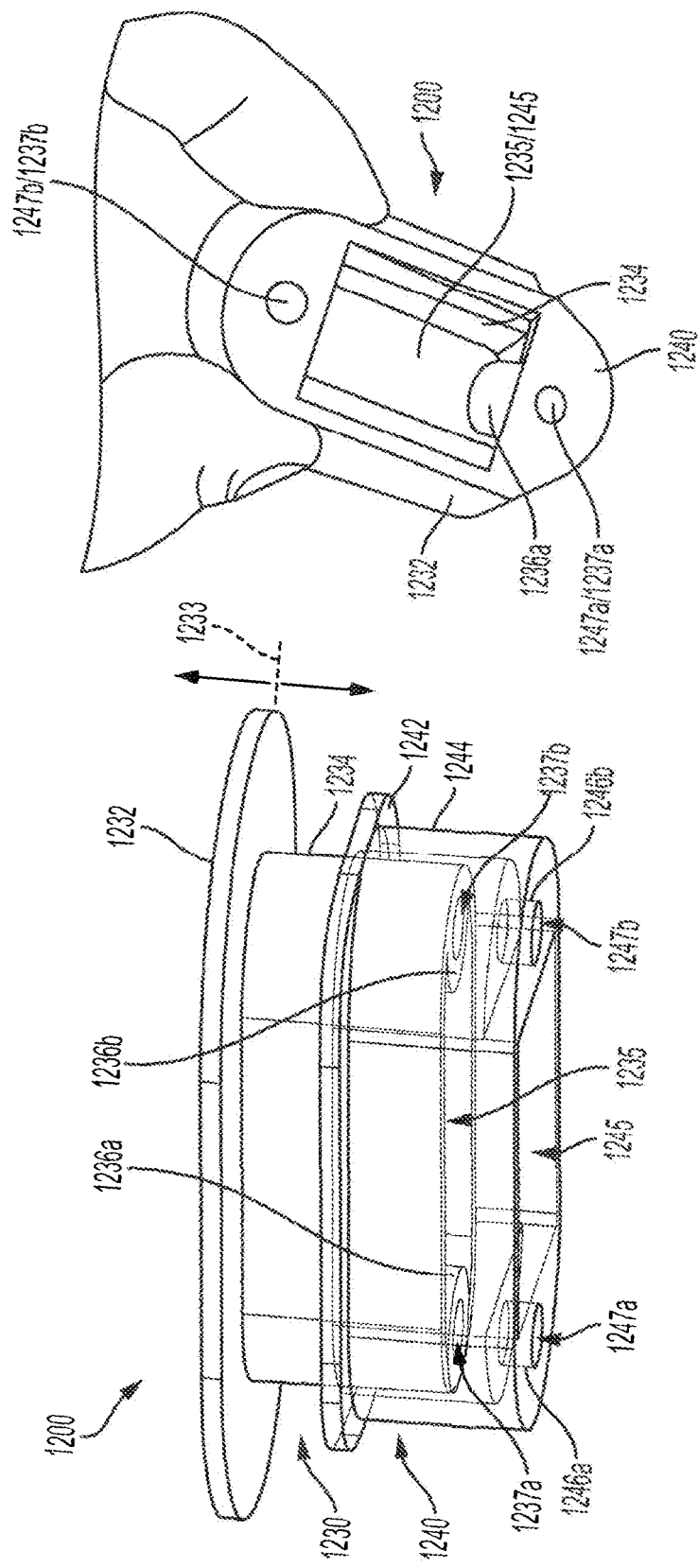

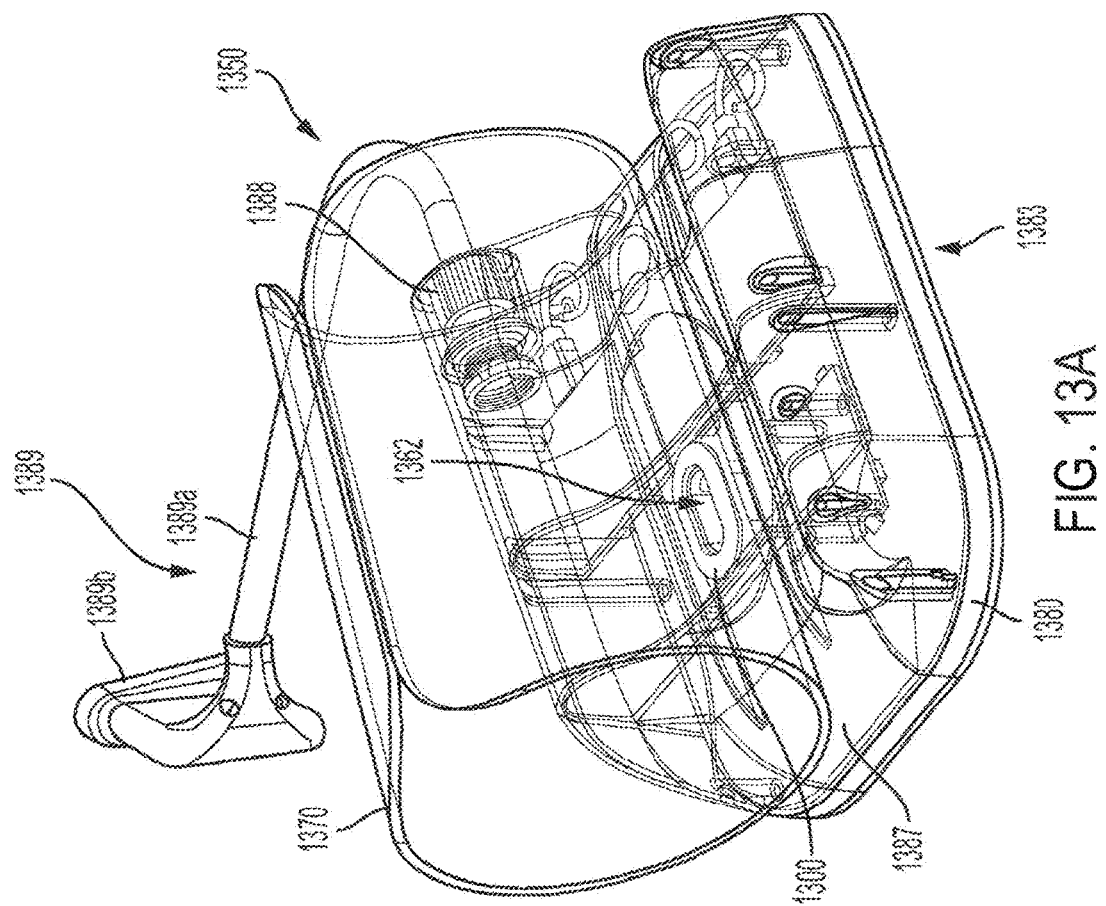

FLEXIBLE RADIO FREQUENCY COIL APPARATUS AND METHODS FOR MAGNETIC RESONANCE IMAGING

CROSS-REFERENCE TO RELATED APPLICATIONS

This application claims the benefit under 35 U.S.C. § 120 as a continuation of PCT Patent Application No. PCT/US2022/012496, filed on Jan. 14, 2022, which claims benefit under 35 U.S.C. § 119(e) of U.S. provisional patent application Ser. No. 63/137,925 filed Jan. 15, 2021, the disclosures of which are incorporated herein by reference in their entirety.

BACKGROUND

Magnetic resonance imaging (MRI) provides an important imaging modality for numerous applications and is widely utilized in clinical and research settings to produce images of the inside of the human body. As a generality, MRI is based on detecting magnetic resonance (MR) signals, which are electromagnetic waves emitted by atoms in response to state changes resulting from applied electromagnetic fields. For example, nuclear magnetic resonance (NMR) techniques involve detecting MR signals emitted from the nuclei of excited atoms upon the re-alignment or relaxation of the nuclear spin of atoms in an object being imaged (e.g., atoms in the tissue of the human body). Detected MR signals may be processed to produce images, which in the context of medical applications, allows for the investigation of internal structures and/or biological processes within the body for diagnostic, therapeutic and/or research purposes.

MRI provides an attractive imaging modality for biological imaging due to the ability to produce non-invasive images having relatively high resolution and contrast without the safety concerns of other modalities (e.g., without needing to expose the subject to ionizing radiation, e.g., x-rays, or introducing radioactive material to the body). Additionally, MRI is particularly well suited to provide soft tissue contrast, which can be exploited to image subject matter that other imaging modalities are incapable of satisfactorily imaging. Moreover, MR techniques are capable of capturing information about structures and/or biological processes that other modalities are incapable of acquiring. However, there are a number of drawbacks to MRI that, for a given imaging application, may involve the relatively high cost of the equipment, limited availability and/or difficulty in gaining access to clinical MRI scanners and/or the length of the image acquisition process.

The trend in clinical MRI has been to increase the field strength of MRI scanners to improve one or more of scan time, image resolution, and image contrast, which, in turn, continues to drive up costs. The vast majority of installed MRI scanners operate at 1.5 or 3 tesla (T), which refers to the field strength of the main magnetic field $B_0$. A rough cost estimate for a clinical MRI scanner is approximately one million dollars per tesla, which does not factor in the substantial operation, service, and maintenance costs involved in operating such MRI scanners.

Additionally, conventional high-field MRI systems typically require large superconducting magnets and associated electronics to generate a strong uniform static magnetic field ($B_0$) in which an object (e.g., a patient) is imaged. The size of such systems is considerable with a typical MRI installment including multiple rooms for the magnet, electronics, thermal management system, and control console areas. The size and expense of MRI systems generally limits their usage to facilities, such as hospitals and academic research centers, which have sufficient space and resources to purchase and maintain them. The high cost and substantial space requirements of high-field MRI systems results in limited availability of MRI scanners. As such, there are frequently clinical situations in which an MRI scan would be beneficial, but due to one or more of the limitations discussed above, is not practical or is impossible, as discussed in further detail below.

SUMMARY

Some embodiments include a radio frequency apparatus configured to detect magnetic resonance signals emitted from anatomy of a patient when positioned within a low-field magnetic resonance imaging system, the radio frequency apparatus comprising: a flexible substrate capable of being positioned about the anatomy of the patient; and a plurality of radio frequency coils coupled to the flexible substrate, each of the plurality of radio frequency coils forming a plurality of turns.

Some embodiments include a magnetic resonance imaging (MRI) system configured to image a patient positioned within the MRI system, the MRI system comprising: a $B_0$ magnet that produces a main magnetic $B_0$ field oriented along a vertical axis; and a radio frequency apparatus configured to detect magnetic resonance signals emitted from anatomy of a patient when positioned within the MRI system, the radio frequency apparatus comprising: a flexible substrate capable of being positioned about the anatomy of the patient; and a plurality of radio frequency coils coupled to the flexible substrate, each of the plurality of radio frequency coils including a conductor forming a plurality of turns and oriented such that, when the flexible substrate is positioned about the anatomy of the patient and placed within the main magnetic $B_0$ field, the plurality of radio frequency coils is configured to detect MR signals produced within the vertically oriented main magnetic $B_0$ field.

Some embodiments include a magnetic resonance imaging (MRI) system configured to image a patient positioned within the MRI system, the MRI system comprising: a $B_0$ magnet that produces a main magnetic $B_0$ field; a first radio frequency apparatus comprising at least one radio frequency transmit coil; and a second radio frequency apparatus configured to detect magnetic resonance signals emitted from anatomy of a patient when positioned within the MRI system, the second radio frequency apparatus comprising: a flexible substrate capable of being positioned about the anatomy of the patient; and a plurality of radio frequency coils coupled to the flexible substrate, each of the plurality of radio frequency coils including a conductor forming a plurality of turns and oriented to detect MR signals produced within the main magnetic $B_0$ field.

BRIEF DESCRIPTION OF THE DRAWINGS

Various aspects and embodiments of the disclosed technology will be described with reference to the following figures. It should be appreciated that the figures are not necessarily drawn to scale.

FIGS. 12A and 12B illustrate an interface component that facilitates making radio frequency coil conductors accessible for connection to electronics of a flexible radio frequency coil apparatus, in accordance with some embodiments;

FIGS. 13A and 13B illustrate a flexible radio frequency apparatus, in accordance with some embodiments;

DETAILED DESCRIPTION

Figure 1:
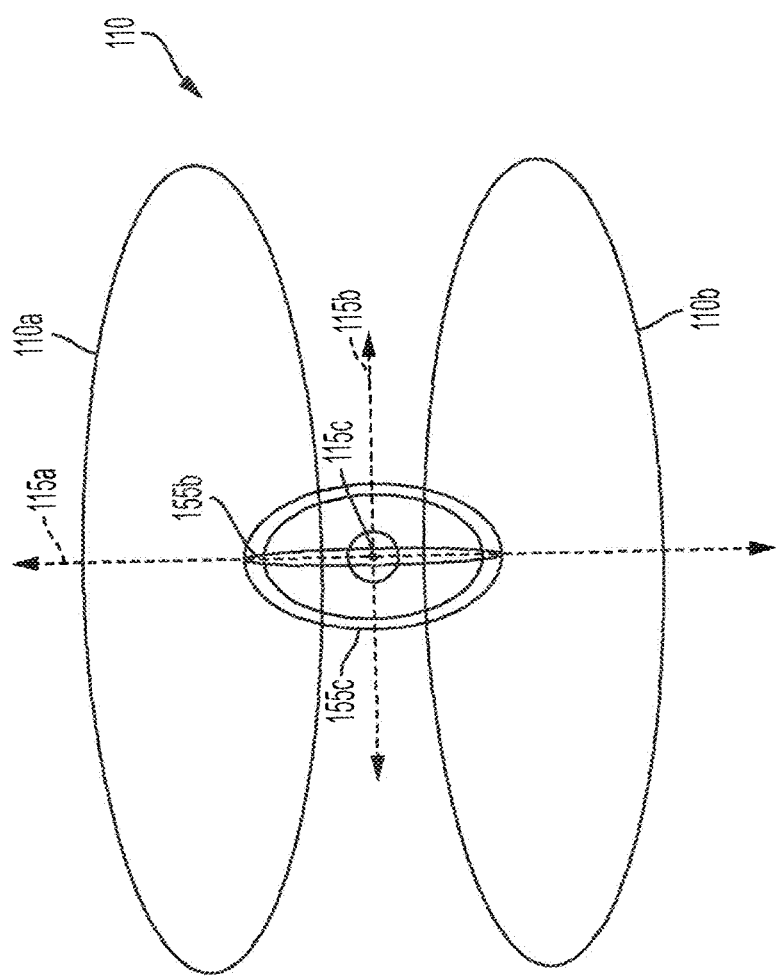
FIG. 1 illustrates an exemplary bi-planar $B_0$ magnetic configuration and radio frequency coils oriented to detect MR signals in the illustrated configuration.

The MRI scanner market is overwhelmingly dominated by high-field systems, and particularly for medical or clinical MRI applications. As discussed above, the general trend in medical imaging has been to produce MRI scanners with increasingly greater field strengths, with the vast majority of clinical MRI scanners operating at 1.5 T or 3 T, with higher field strengths of 7 T and 9 T used in research settings. As used herein, "high-field" refers generally to MRI systems presently in use in a clinical setting and, more particularly, to MRI systems operating with a main magnetic field (i.e., a $B_0$ field) at or above 1.5 T, though clinical systems operating between 0.5 T and 1.5 T are often also characterized as "high-field." Field strengths between approximately 0.2 T and 0.5 T have been characterized as "mid-field" and, as field strengths in the high-field regime have continued to increase, field strengths in the range between 0.5 T and 1 T have also been characterized as mid-field. By contrast, "low-field" refers generally to MRI systems operating with a $B_0$ field of less than or equal to approximately 0.2 T, though systems having a $B_0$ field of between 0.2 T and approximately 0.3 T have sometimes been characterized as low-field as a consequence of increased field strengths at the high end of the high-field regime. Within the low-field regime, low-field MRI systems operating with a $B_0$ field of less than 0.1 T are referred to herein as "very low-field" and low-field MRI systems operating with a $B_0$ field of less than 10 mT are referred to herein as "ultra-low field."

As discussed above, conventional MRI systems require specialized facilities. An electromagnetically shielded room is required for the MRI system to operate and the floor of the room must be structurally reinforced. Additional rooms must be provided for the high-power electronics and the scan technician's control area. Secure access to the site must also be provided. In addition, a dedicated three-phase electrical connection must be installed to provide the power for the electronics that, in turn, are cooled by a chilled water supply. Additional HVAC capacity typically must also be provided. These site requirements are not only costly, but significantly limit the locations where MRI systems can be deployed. Conventional clinical MRI scanners also require substantial expertise to both operate and maintain. These highly trained technicians and service engineers add large on-going operational costs to operating an MRI system. Conventional MRI, as a result, is frequently cost prohibitive and is severely limited in accessibility, preventing MRI from being a widely available diagnostic tool capable of delivering a wide range of clinical imaging solutions wherever and whenever needed. Typically, patient must visit one of a limited number of facilities at a time and place scheduled in advance, preventing MRI from being used in numerous medical applications for which it is uniquely efficacious in assisting with diagnosis, surgery, patient monitoring and the like.

As discussed above, high-field MRI systems require specially adapted facilities to accommodate the size, weight, power consumption and shielding requirements of these systems. For example, a 1.5 T MRI system typically weighs between 4-10 tons and a 3 T MRI system typically weighs between 8-20 tons, and consume between 20-40 kW of power during operation using dedicated and specialized power sources. In addition, high-field MRI systems generally require significant amounts of heavy and expensive shielding. Many mid-field scanners are even heavier, weighing between 10-20 tons due, in part, to the use of very large permanent magnets and/or yokes. Commercially available low-field MRI systems (e.g., operating with a $B_0$ magnetic field of 0.2 T) are also typically in the range of 10 tons or more and commonly consume between 5-20 kW during operation. Thus, available clinical MRI systems are immobile and require the significant expense of a large, dedicated space within a hospital or facility, and in addition to the considerable costs of preparing the space for operation, require further additional on-going costs in expertise in operating and maintaining the system.

Accordingly, the many requirements of high-field MRI render installations prohibitive in many situations, limiting their deployment to large institutional hospitals or specialized facilities and generally restricting their use to tightly scheduled appointments, requiring the patient to visit dedicated facilities at times scheduled in advance. Thus, the many restrictions on high field MRI prevent MRI from being fully utilized as an imaging modality. Despite the drawbacks of high-field MRI mentioned above, the appeal of the significant increase in SNR at higher fields continues to drive the industry to higher and higher field strengths for use in clinical and medical MRI applications, further increasing the cost and complexity of MRI scanners, and further limiting their availability and preventing their use as a general-purpose and/or generally-available imaging solution.

The low SNR of MR signals produced in the low-field regime (particularly in the very low-field regime) has prevented the development of a relatively low cost, low power and/or portable MRI system. Conventional "low-field" MRI systems operate at the high end of what is typically characterized as the low-field range (e.g., clinically available low-field systems have a floor of approximately 0.2 T) to achieve useful images. Though somewhat less expensive than high-field MRI systems, conventional low-field MRI systems share many of the same drawbacks. In particular, conventional low-field MRI systems are large, fixed and immobile installments, consume substantial power (requiring dedicated three-phase power hook-ups) and require specially shielded rooms and large dedicated spaces. The challenges of low-field MRI have prevented the development of relatively low cost, low power and/or portable MRI systems that can produce useful images.

Applicant has developed techniques enabling portable, low-field, low power and/or lower-cost MRI systems that can improve the wide-scale deployability of MRI technology in a variety of environments beyond the current MRI installments at hospitals and research facilities. As a result, MRI can be deployed in emergency rooms, small clinics, doctor's offices, in mobile units, in the field, etc. and may be brought to the patient (e.g., bedside) to perform a wide variety of imaging procedures and protocols. Examples of portable low-field MRI systems that can be transported to the patient to provide a wide variety of diagnostic, surgical, monitoring and/or therapeutic procedures, generally, whenever and wherever needed are described in U.S. patent Ser. No. 10/222,434 (hereinafter, "the '434 patent"), titled "Portable Magnetic Resonance Imaging Methods and Apparatus," issued Mar. 5, 2019, which patent is herein incorporated by reference in its entirety.

A challenge in MRI involves positioning radio frequency coils configured to detect magnetic resonance (MR) signals relative to patient anatomy targeted for imaging and positioning the target patient anatomy within the MRI system for imaging. Conventional MRI systems typically include an integrated bed or support for the patient that is constructed using non-ferrous material to satisfy stringent regulatory requirements (e.g., regulations promulgated to ensure both patient and clinician safety) and so as to not disturb the magnetic fields produced by the MRI system. This customized MRI-safe bed is generally configured to be slid into and out of the bore of the system and typically has mounts that allow the appropriate radio frequency coil apparatus to be connected over the portion of the anatomy to be imaged. When preparing a patient for imaging, the patient is positioned on the bed outside the magnet bore so that the radio frequency coil apparatus can be positioned and attached to the cooperating mounts on the bed. For example, to perform a scan of a targeted portion of a patient's leg such as the knee, a radio frequency coil housed in a rigid shell is positioned over the patient's leg and attached to cooperating mounts fixed to the bed. After the radio frequency coil apparatus is attached and positioned correctly, the bed is moved inside the $B_0$ magnet so that the portion of the anatomy being imaged is positioned within the image region of the MRI system.

This conventional process is not applicable to portable or point-of-care MRI, nor can this process be used to image a patient from a standard medical bed or wheelchair. For example, standard medical beds are not equipped with mounts to which a radio frequency coil apparatus can be attached, nor are radio frequency coil apparatus configured to be attached to standard medical beds. In addition, a standard medical bed or wheelchair cannot be positioned within the imaging region of an MRI system. To facilitate imaging from, for example, a standard medical bed, the inventors have developed radio frequency coil apparatus adapted to flexibly accommodate target anatomy of a patient and configured to engage with a cooperating member attached to the MRI system so that when the radio frequency coil apparatus is engaged with the member, the target anatomy is positioned within the imaging region of the MRI system. In this way, the radio frequency coil apparatus can be positioned about the patient and attached to a portable MRI system so that the patient can be imaged from a standard medical bed or wheelchair, allowing the MRI system to be brought to the patient or the patient wheeled to an available MRI system and imaged from the standard medical bed. Such point-of-care MRI allows MRI to be utilized in a wide variety of medical situations where conventional MRI is not available (e.g., in the emergency room, intensive care unit, operating rooms, etc.).

Moreover, the rigid shell conventionally used to house radio frequency coils in conventional MRI does not allow the coils to closely follow the contours of the anatomy being imaged and typically does not allow the coils to surround the anatomy being imaged. For example, RF transmit coils generate RF pulses for producing an RF magnetic field perpendicular to the main magnetic field produced by a $B_0$ magnet. An important design criteria for RF transmit coils is configuring the RF transmit coil(s) such that the coil is capable of generating a homogeneous magnetic field. Specifically, the strength of the magnetic field generated by the RF transmit coils should be uniform throughout an imaging region of the MRI system in order to obtain high quality MR images. To ensure the homogeneity of the RF magnetic field, it is advantageous to design the RF transmit coils so that they are disposed on a rigid substrate. RF receive coils receive MR signals from nuclear spins excited by the RF pulses transmitted by RF transmit coils. In contrast to RF transmit coils, an important consideration in designing RF receive coils is the maximization of signal-to-noise ratio (SNR). To maximize SNR, it is advantageous to position RF receive coils as close to the patient anatomy being imaged as possible (e.g., being flexibly wrapped around a patient anatomy).

Therefore, the inventors have recognized that RF transmit coils and receive coils have competing design considerations such that combining the RF transmit and receive coils in a single apparatus results in drawbacks to one or both of the design criteria described above. In particular, the inventors have recognized, however, that while it is beneficial to position RF transmit coils on a rigid substrate to maximize homogeneity of the transmit field, RF receive coils do not possess the same design requirements for maximizing homogeneity, but rather prioritize configurations that optimize SNR. Accordingly, while conventional RF coils which may combine transmit and receive coils into a single apparatus or coil prioritize homogeneity by disposing the coil(s) on a rigid substrate, such as a printed circuit board (PCB) with the RF coil being disposed in grooves of the PCB, the inventors have recognized that the RF coils may be separated into transmit and receive components, which allows each component to be optimized for its particular design priority. Therefore, RF receive coils may be configured to closely follow the contours of a patient anatomy without experiencing drawbacks in field homogeneity. The inventors have developed a flexible radio frequency coil apparatus that allows the apparatus to be positioned around or about the anatomy being scanned to provide a closer fit to the specific patient's anatomy and further allows the radio frequency coil apparatus to be fitted to the patient wherever the patient is located. For example, for a scan of a patient's knee, an array of radio frequency coils affixed, mounted to or embedded within a flexible substrate can be wrapped about the patient's knee so that the coils can closely follow the contours of the specific patient's leg. The flexible substrate may be attached to a base that comprises the releasable mechanism so that the flexible radio frequency coil apparatus can be correctly positioned within the imaging region of the magnetic resonance imaging system.

The low frequencies involved in low-field MRI permit the conducting paths of transmit/receive coils to be quite long, allowing for radio frequency coils to comprise a plurality of turns or loops. As used herein, a "turn" refers to a conductive path provided 360° or substantially 360° about a reference axis (e.g., the principal axis of the coil, as discussed in further detail below). It should be appreciated that a turn need not form a closed loop provided the conductive path is formed substantially 360° about the reference axis. A general rule of thumb prescribes that the length of the conductor in a resonant coil should not exceed one tenth of the wavelength at the resonant frequency. Thus, a high-field MRI system with a $B_0$ magnetic field of 3 T operates at approximately 128 MHz and so has a wavelength of approximately 2.3 meters. Thus, the length of the conductors in the transmit/receive coils for such a high-field system should not exceed 23 centimeters. By contrast, a low-field MRI system with a $B_0$ field of 0.2 T may operate at approximately 8.5 MHz and so has a wavelength of approximately 35 meters and therefore transmit/receive coils can include conductors having lengths up to approximately 3.5 meters. A low field MRI system with a $B_0$ field of 0.1 T operates at approximately 4.3 MHz and so has a wavelength of approximately 70 meters and therefore transmit/receive coils can include conductors having lengths up to approximately 7 meters. A low-field MRI system with a $B_0$ field of 0.05 T operates at approximately 2.15 MHz (~140 meter wavelength) and corresponding transmit/receive coils can utilize conductors having lengths up to 14 meters, and so on. The inventors have recognized that the significantly longer conductor lengths permitted in the low-field regime allows for radio frequency coils that include one or more conductors each having multiple turns (e.g., 5, 10, 15, 20, 30, 50 turns or more) which increases the sensitivity of the coil in responding to MR signals given an increase in the Q factor of the coil with additional turns of the coil. Exemplary coils having conductors arranged in a plurality of turns are discussed in further detail herein. By contrast, the limitation on the lengths of the conductors in a high-field system preclude using RF coils having a single conductor that is arranged using multiple turns.

In addition, aspects of the inventors' flexible radio frequency apparatus provide for an array of radio frequency coils that, when positioned about anatomy to be imaged, are oriented to detect MR signals excited using a low-field MRI system having an "open" configuration in which the $B_0$ field is oriented differently (typically orthogonally) relative to convention high-field MRI systems. For example, some embodiments include a flexible radio frequency apparatus configured to operate in conjunction with a low-field MRI system employing a bi-planar magnet configuration between which a patient's anatomy being imaged is placed such that the $B_0$ field is oriented substantially perpendicular to the longitudinal axis of the patient's anatomy, as opposed to conventional MRI systems that produce a $B_0$ field that is substantially aligned with the longitudinal axis of the anatomy being imaged (e.g., conventional high-field MRI systems that employ a solenoid coil positioned about a longitudinal bore to generate a main $B_0$ magnetic field aligned with the horizontal axis). As a result, radio frequency coils configured for use with exemplary low-field MRI systems described herein are oriented differently than radio frequency coils employed in conventional high-field MRI.

Accordingly, the inventors have developed a radio frequency apparatus configured to detect magnetic resonance signals emitted from anatomy (e.g., a knee) of a patient when positioned within a low-field magnetic resonance imaging system. In some embodiments, the radio frequency apparatus comprises a flexible substrate capable of being positioned about the anatomy of the patient; and a plurality of radio frequency coils coupled to the flexible substrate, each of the plurality of radio frequency coils forming a plurality of turns.

In some embodiments, the plurality of radio frequency coils are oriented such that, when the flexible substrate is positioned about the anatomy of the patient and placed within the main magnetic $B_0$ field, the plurality of radio frequency coils is capable of detecting MR signals produced within the vertically oriented main magnetic $B_0$ field.

In some embodiments, the low-field magnetic resonance imaging system operates at a $B_0$ field strength between 0.02 T and 0.2 T. each of the plurality of radio frequency coils including a conductor having a length between 100 and 1000 cm.

In some embodiments, when the flexible substrate is wrapped about the anatomy of the patient, the plurality of radio frequency coils together cover substantially a full circumference about the patient anatomy.

In some embodiments, the plurality of radio frequency coils are coupled to the flexible substrate and positioned so that, when the flexible substrate is wrapped about the anatomy of the patient, the plurality of radio frequency coils conforms to contours of the patient anatomy.

In some embodiments, the radio frequency apparatus further comprises a base coupled to the flexible radio frequency coil component and configured to support the anatomy of the patient, the base comprising a releasable securing mechanism configured to mechanically couple the base to a member attached to the magnetic resonance imaging system at a location so that whenever the base is secured to the member, the radio frequency apparatus is substantially within an imaging region of the magnetic resonance imaging system.

In some embodiments, the conductor of at least one of the plurality of radio frequency coils comprises a multi-stranded wire. In some embodiments, the conductor of each of the plurality of radio frequency coils comprises between three and fifteen turns. In some embodiments, the conductor of each of the plurality of radio frequency coils comprises between five and ten turns. In some embodiments, the conductor of each of the plurality of radio frequency coils comprises either seven turns or eight turns.

In some embodiments, the plurality of radio frequency coils comprises a plurality of proximal coils and a plurality of distal coils. In some embodiments, each of the plurality of proximal coils is larger than each of the plurality of distal coils. In some embodiments, the plurality of radio frequency coils comprises a plurality of central coils positioned between the plurality of proximal coils and the plurality of distal coils. In some embodiments, each of the plurality of central coils is larger than each of the plurality of proximal coils and each of the plurality of distal coils.

In some embodiments, each of the plurality of radio frequency coils overlaps with at least one other of the plurality of radio frequency coils. In some embodiments, each of the plurality of proximal coils overlaps with at least one other proximal coil, and wherein each of the plurality of distal coils overlaps with at least one other distal coil. In some embodiments, each of the plurality of central coils overlaps with at least one other central coil. In some embodiments, each of the plurality of central coils overlaps with at least one of the plurality of proximal coils and at least one of the plurality of distal coils.

In some embodiments, the radio frequency apparatus comprises at least one fastener configured to hold the flexible substrate in place after it has been positioned about the anatomy of the patient. In some embodiments, the at least one fastener comprises at least one hook and loop strap, at least one snap and/or and least one buckle.

In some embodiments, the magnetic resonance imaging system comprises a $B_0$ magnet that produces a main magnetic $B_0$ field oriented along a vertical axis, and wherein the plurality of radio frequency coils is oriented such that, when the flexible substrate is positioned about the anatomy of the patient and placed within the main magnetic $B_0$ field, the plurality of radio frequency coils is capable of detecting MR signals produced within the vertically oriented main magnetic $B_0$ field.

In some embodiments, each of the plurality of radio frequency coils has at least one surface normal vector substantially orthogonal to the vertical axis when the flexible substrate is positioned about the anatomy of the patient.

In some embodiments, the magnetic resonance system operates with a $B_0$ field strength between 0.2 T and 0.01 T, and wherein each of the plurality of radio frequency coils includes a conductor having a length between 100 and 1000 cm. In some embodiments, the magnetic resonance system operates with a $B_0$ field strength between 0.1 T and 0.02 T, and wherein the conductor of each of the plurality of radio frequency coils has a length between 200 and 500 cm.

In some embodiments, the radio frequency apparatus further comprises a flexible radio frequency coil component that includes the flexible substrate and the plurality of radio frequency coils coupled to the flexible substrate, wherein when the flexible radio frequency component is wrapped about the anatomy of the patient, the plurality of radio frequency coils conforms to contours of the patient anatomy; and a base coupled to the flexible radio frequency coil component and configured to support the anatomy of the patient and comprising a releasable securing mechanism configured to secure the base to a member attached to the magnetic resonance imaging system at a location so that whenever the base is secured to the member, the radio frequency apparatus is substantially within an imaging region of the magnetic resonance imaging system.

In some embodiments, the base houses electronics configured to receive signals from the plurality of radio frequency coils. In some embodiments, the base is contoured to support the anatomy of the patient being imaged. In some embodiments, the base comprises a valley portion configured to accommodate the anatomy being imaged, the valley formed by a pair of shoulders on respective sides of the base. In some embodiments, one of the pair of shoulders is lower than the other shoulder to facilitate positioning the anatomy within the valley of the base. In some embodiments, the base is rigid. In some embodiments, the flexible substrate comprises a first aperture and the base comprises a second aperture, and wherein a conductor for each of the plurality of radio frequency coils passes through the first and second apertures to connect to the electronics. In some embodiments, the electronics comprises a plurality of linear amplifiers.

In some embodiments, the radio frequency apparatus further comprises an interface component positioned within the first and second apertures configured to facilitate passing the conductor for each of the radio frequency coils through the first and second apertures, the interface component comprising: a first portion positioned through the first aperture; and a second portion positioned through the second aperture, wherein the second portion forms a receptacle for the first portion, and wherein when the first portion is positioned within the second portion, the interface component comprises a conduit for the conductor of each of the radio frequency coils to pass through the first and second apertures to connect to the electronics. In some embodiments, the first portion comprises a first body portion sized to fit within the first aperture and a brim portion having a circumference greater than a circumference of the first aperture. In some embodiments, the second portion comprises a second body portion that includes the receptacle for the first portion, wherein the second body portion is sized to fit within the second aperture, and wherein the second portion further comprises a lip portion having a circumference greater than a circumference of the second aperture.

In some embodiments, the flexible substrate comprises a plurality of layers including at least one bottom layer having the first aperture, and wherein the brim portion is positioned between the at least one bottom layer and at least one other of the plurality of layers.

In some embodiments, the flexible substrate comprises a plurality of layers including a first layer and a second layer, and wherein the plurality of radio frequency coils is coupled to the flexible substrate between the first layer and the second layer of the flexible substrate.

According to some embodiments, there is provided a magnetic resonance imaging (MRI) system configured to image a patient positioned within the MRI system, the MRI system comprising: a $B_0$ magnet that produces a main magnetic $B_0$ field oriented along a vertical axis; and a radio frequency apparatus configured to detect magnetic resonance signals emitted from anatomy of a patient when positioned within the MRI system, the radio frequency apparatus comprising: a flexible substrate capable of being positioned about the anatomy of the patient; and a plurality of radio frequency coils coupled to the flexible substrate, each of the plurality of radio frequency coils including a conductor forming a plurality of turns and oriented such that, when the flexible substrate is positioned about the anatomy of the patient and placed within the main magnetic $B_0$ field, the plurality of radio frequency coils is configured to detect MR signals produced within the vertically oriented main magnetic $B_0$ field.

In some embodiments, the MRI system operates with a $B_0$ field strength between 0.2 T and 0.01 T, and wherein each of the plurality of radio frequency coils includes a conductor having a length between 100 and 1000 cm. In some embodiments, the MRI system, further comprises a base coupled to the flexible substrate and configured to support the anatomy of the patient. In some embodiments, the base comprises a releasable securing mechanism configured to mechanically couple the base to a member attached to the MRI system at a location such that the releasable securing mechanism is coupled to the member, the radio frequency apparatus is substantially within an imaging region of the MRI system. In some embodiments, the base houses electronics configured to receive signals from the plurality of radio frequency coils. In some embodiments, the base comprises a valley portion configured to accommodate the anatomy being imaged, the valley formed by a pair of shoulders. In some embodiments, the base is rigid. In some embodiments, the flexible substrate comprises a first aperture through which each of the plurality of radio frequency coils passes through. In some embodiments, the MRI system further comprises a base coupled to the flexible substrate and configured to support the anatomy of the patient and house electronics for the plurality of radio frequency coils, wherein the base comprises a second aperture through which each of the plurality of radio frequency coils passes through to connect the plurality of radio frequency coils to the electronics housed by the base.

Some embodiments include a magnetic resonance imaging (MRI) system configured to image a patient positioned within the MRI system, the MRI system comprising: a $B_0$ magnet that produces a main magnetic $B_0$ field; a first radio frequency apparatus comprising at least one radio frequency transmit coil; and a second radio frequency apparatus configured to detect magnetic resonance signals emitted from anatomy of a patient when positioned within the MRI system, the second radio frequency apparatus comprising: a flexible substrate capable of being positioned about the anatomy of the patient; and a plurality of radio frequency coils coupled to the flexible substrate, each of the plurality of radio frequency coils including a conductor forming a plurality of turns and oriented to detect MR signals produced within the main magnetic $B_0$ field.

MRI involves placing a subject to be imaged (e.g., all or a portion of patient anatomy) in a static, homogenous magnetic field $B_0$ to align a subject's atomic net magnetization (often represented by a net magnetization vector) in the direction of the $B_0$ field. One or more transmit coils are then used to generate a pulsed magnetic field Bi having a frequency related to the rate of precession of atomic spins of the atoms in the magnetic field $B_0$ to cause the net magnetization of the atoms to develop a component in a direction transverse to the direction of the $B_0$ field. After the Bi field is turned off, the transverse component of the net magnetization vector precesses and its magnitude decays over time until the net magnetization re-aligns with the direction of the $B_0$ field if allowed to do so. This process produces MR signals that can be detected, for example, by measuring electrical signals induced in one or more receive coils of the MRI system that are tuned to resonate at the frequency of the MR signals.

MR signals are rotating magnetic fields, often referred to as circularly polarized magnetic fields, that can be viewed as comprising linearly polarized components along orthogonal axes. That is, an MR signal is composed of a first sinusoidal component that oscillates along a first axis and a second sinusoidal component that oscillates along a second axis orthogonal to the first axis. The first sinusoidal component and the second sinusoidal component oscillate 90° out-of-phase with each other. An appropriately arranged coil tuned to the resonant frequency of the MR signals can detect a linearly polarized component along one of the orthogonal axes. In particular, an electrical response may be induced in a tuned receive coil by the linearly polarized component of an MR signal that is oriented along an axis approximately orthogonal to the current loop of the coil, referred to herein as the principal axis of the coil.

Accordingly, radio frequency coils configured to excite and detect MR signals, which may include separate coils for transmitting and receiving, multiple coils for transmitting and/or receiving, or the same coils for transmitting and receiving, need to be oriented appropriately relative to the $B_0$ magnetic field to perform MRI. As discussed above, whereas conventional high-field MRI scanners produce a $B_0$ field oriented in directions along a horizontal axis (e.g., along the longitudinal axis of the bore), exemplary low-field MRI devices described herein produce a $B_0$ field oriented in directions along a vertical axis. For example, FIG. 1 illustrates an exemplary bi-planar geometry for a $B_0$ magnet, in accordance with some embodiments. $B_0$ magnet 110 is schematically illustrated by magnet 110a and 100b arranged substantially parallel to one another to generate a $B_0$ field generally along axis 115a (either in the upward or downward direction) to provide a field of view between the magnets 110a and 100b (i.e., a region between the magnets wherein the homogeneity of the $B_0$ field is suitable for MRI).

A first RF coil (or multiple RF coils) is schematically illustrated as RF coil 155b, which is/are arranged to generate a pulsed oscillating magnetic field generally along axis 115b (i.e., the principal axis of RF coil(s) 155b) to stimulate an MR response and/or to detect the MR signal component oriented substantially along the principal axis 115b (i.e., linearly polarized components of the MR signal aligned with the coil's principal axis). A second RF coil (or multiple RF coils) is schematically illustrated as RF coil 155c, which is/are arranged to generate a pulsed oscillating magnetic field generally along axis 115c (i.e., the principal axis of RF coil(s) 155c into and out of the plane of the drawing) to stimulate an MR response and/or to detect the MR signal component oriented substantially along the principal axis 115c (i.e., linearly polarized components of the MR signal aligned with the coil's principal axis). The inventors have developed flexible radio frequency coils configured to operate in conjunction with these low-field MRI devices by providing an array of coils that when positioned about a patient's anatomy to be imaged are oriented to detect MR signals emitted from the patient positioned within a vertically oriented $B_0$ magnetic field.

As discussed above, to transmit excitation pulse sequences and to detect emitted MR signals, transmit/receive coils must resonate at a precession frequency (referred to as the Larmor frequency for hydrogen) that relates to the strength of the $B_0$ field. That is, as the strength of the $B_0$ field increases, so does the corresponding precession frequency. Accordingly, transmit/receive coils in the high-field regime must resonate at significantly higher frequencies (shorter wavelengths) than their low-field counterparts. As such, the lower resonate frequencies associated with low-field MRI facilitate different radio frequency coil design for apparatus configured to operate in the low-field regime. For example, the length of a conducting path of a resonant coil is constrained by the frequency at which the resonant coil is intended to resonate. In particular, the higher the frequency, the shorter the conductive path must be for the resonant coil to operate satisfactorily. Thus, the conducting paths of high-field transmit/receive coils are required to be very short. To meet this requirement, high-field transmit/receive coils are frequently single turn conductive loops formed by etching, cutting or milling conductive sheets (e.g., copper sheets). Typical conducting paths for high-field transmit/receive coils are limited in length to tens of centimeters.

Figure 2:
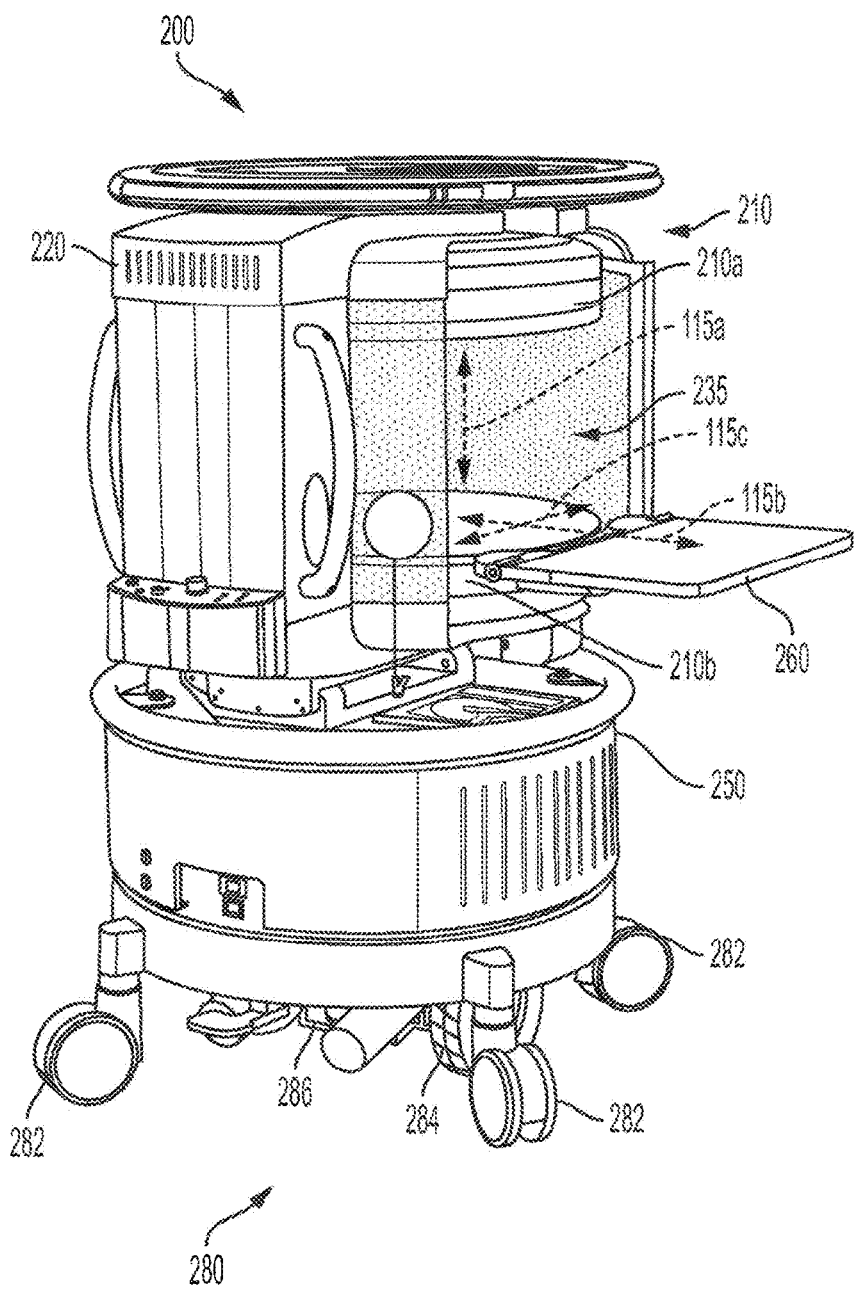
FIG. 2 illustrates a portable low-field MRI system, in accordance with some embodiments.

FIG. 2 illustrates a low power, portable low-field MRI system for which some embodiments of a flexible radio frequency apparatus is configured to operate. According to some embodiments, portable MRI system 200 is low-field MRI system operating with a $B_0$ magnetic field of less than or equal to 0.2 T and greater than 0.1 T, and according to some embodiments, portable MRI system 200 is a very low-field MRI system operating with a $B_0$ magnetic field of less than or equal to 0.1 T and greater than 10 mT (e.g., 0.1 T, 50 mT, 20 mT, etc.), that facilitate portable, low-cost, low-power MRI and may significantly increase the availability of MRI in a clinical setting. Portable MRI system 200 comprises a $B_0$ magnet 210 including at least one first permanent magnet 210a and at least one second permanent magnet 210b magnetically coupled to one another by a ferromagnetic yoke 220 configured to capture and channel magnetic flux to increase the magnetic flux density within the imaging region (field of view) of the MRI system. Permanent magnets 210a and 210b may be constructed using any suitable technique, (e.g., using any of the techniques, designs and/or materials described in the '434 patent). Yoke 220 may also be constructed using any of suitable technique such as those described in the '434 patent. It should be appreciated that, in some embodiments, $B_0$ magnet 210 may be formed using electromagnets instead in addition to or as an alternative to permanent magnets (e.g., as also described in the '434 patent).

Exemplary $B_0$ magnet 210 illustrated in FIG. 2 is configured in a bi-planar arrangement such that the $B_0$ magnetic field is oriented along a vertical axis 115a. The direction of the $B_0$ magnetic field along the vertical axis for the exemplary configuration illustrated in FIG. 2 may be in either the upward or downward direction. As a result, radio frequency (RF) coils having a principal axis aligned with a horizontal axis orthogonal to the vertical axis, such as longitudinal axis 115b or axial axis 115c, will be optimally positioned to excite and detect an MR response from anatomy positioned within imaging region 235. The inventors have developed a flexible radio frequency apparatus that allows a radio frequency coil array to be flexibly wrapped about anatomy to be imaged so that principal axes of the coils are oriented to suitably detect MR signals in association with the $B_0$ magnet configuration illustrated in FIG. 2, examples of which are described in further detail below.

$B_0$ magnet 210 may be coupled to or otherwise attached or mounted to base 250 that, in addition to providing the load bearing structures for supporting the $B_0$ magnet, also includes an interior space configured to house electronics needed to operate portable MRI system 200. The exemplary portable MRI system 200 illustrated in FIG. 2 also comprises a conveyance mechanism 280 that allows the portable MRI system to be transported to different locations. The conveyance mechanism may comprise one or more components configured to facilitate movement of the portable MRI system, for example, to a location at which MRI is needed. According to some embodiments, conveyance mechanism comprises a motor 286 coupled to drive wheels 284. In this manner, conveyance mechanism 280 provides motorized assistance in transporting MRI system 200 to desired locations. Conveyance mechanism 280 may also include a plurality of castors 282 to assist with support and stability as well as facilitating transport.

MRI system 200 is also equipped with a fold-out bridge 260 that is capable of being raised (e.g., during transport) and lowered (e.g., as shown in FIG. 2) to support patient anatomy during imaging, and may include any one or more of the features of a fold-out bridge described in International Publication No. WO 2020/018896 A1, titled "Methods and Apparatus for Patient Positioning in Magnetic Resonance Imaging" ('896 application) and filed Jul. 19, 2019, the entirety of which is incorporated by reference herein. This exemplary low-field MRI systems can be used to provide point-of-care MRI, either by bringing the MRI system directly to the patient or bringing the patient to a relatively nearby MRI system (e.g., by wheeling the patient to the MRI system in a standard hospital bed, wheelchair, etc.). The inventors have developed flexible radio frequency apparatus configured for use in such an MRI system, though the aspects are not limited for use with any particular MRI system.

Following below are more detailed descriptions of various concepts related to, and embodiments of, flexible radio frequency apparatus configured to operate as radio frequency transmit/receive coils in a low-field MRI system such as described above in connection with FIG. 2, though the aspects are not limited for use with any particular MRI system. It should be appreciated that the embodiments described herein may be implemented in any of numerous ways. Examples of specific implementations are provided below for illustrative purposes only. It should be appreciated that the embodiments and the features/capabilities provided may be used individually, all together, or in any combination of two or more, as aspects of the technology described herein are not limited in this respect.

Figure 3:
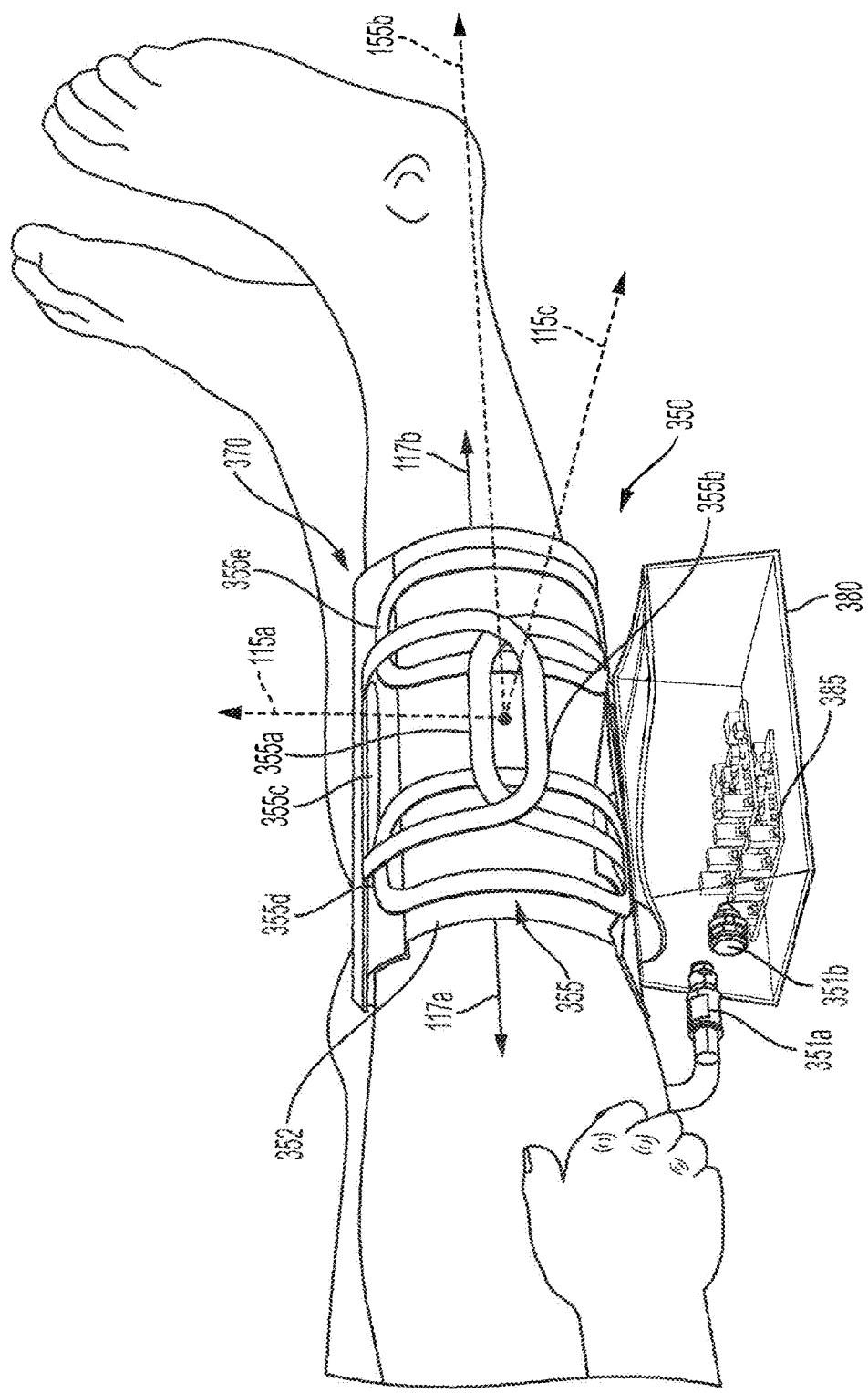
FIG. 3 illustrates a flexible radio frequency coil apparatus, in accordance with some embodiments.

FIG. 3 illustrates a flexible radio frequency (RF) apparatus positioned about the leg of a patient to perform a scan of the patient's knee, in accordance with some embodiments. Flexible RF apparatus 350 comprises a flexible RF coil component 370 having an array of RF coils 355 that are mounted on, affixed to, or integrated in a flexible substrate 352 configured to wrap around patient anatomy (e.g., a leg of the patient), and a base 380 (e.g., a rigid base) adapted to support the patient anatomy and house electronics 385. The exemplary coil array 355 illustrated in FIG. 3 comprises four central RF coils and four peripheral coils of which central RF coils 355a-c and peripheral coils 355d-e are visible in the exemplary embodiment illustrated in FIG. 3. The peripheral coils include a pair of proximal coils positioned proximally (in a direction towards the patient's head denoted by proximal direction arrow 117*a*) to the central RF coils of which proximal coil 355*d* is visible in FIG. 3, and a pair of distal coils positioned distally (in a direction towards the patient's head denoted by proximal direction arrow 117*b*) to the central RF coils of which distal coil 355*e* is visible in FIG. 3. Each RF coil overlaps with at least one other RF coil in coil array 355 to reduce the inductive coupling between coils, as discussed in further detail below.

Figure 15A:
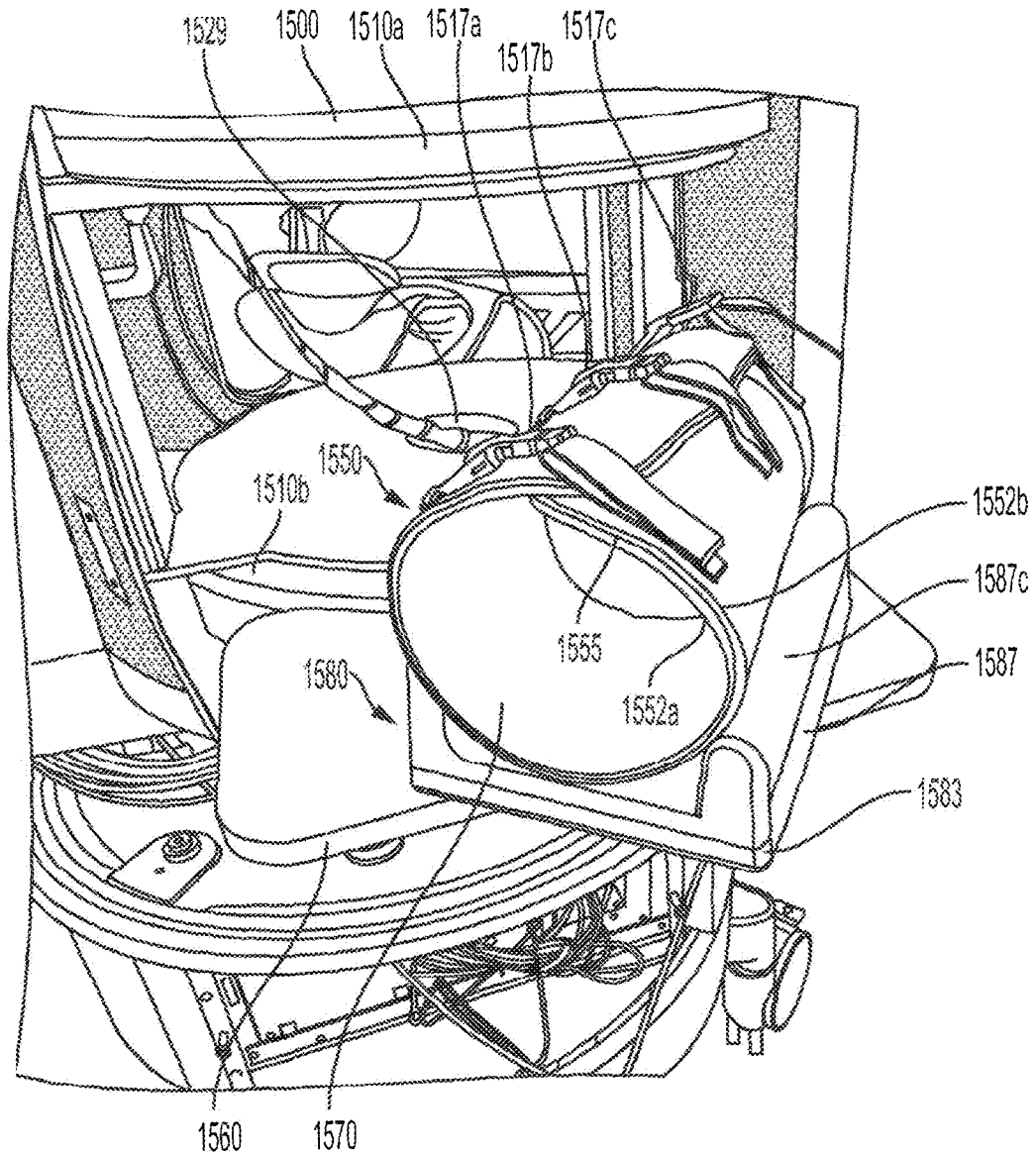
FIGS. 15A and 15B illustrate exemplary flexible radio frequency coil apparatus and a low-field magnetic resonance imaging system for which the apparatus is configured to operate with, in accordance with some embodiments.
Figure 15B:
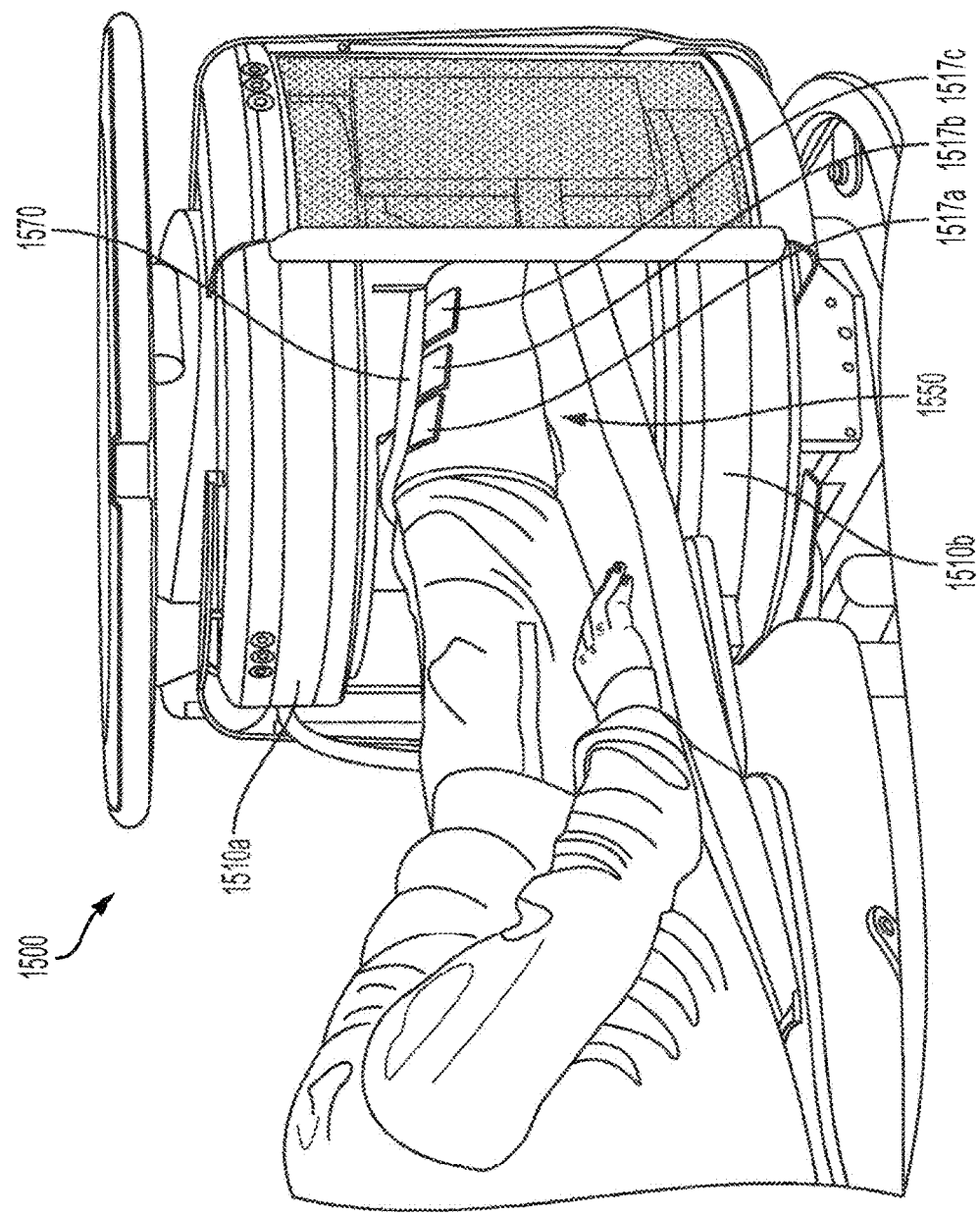

Vertical axis 115*a* (e.g., the axis along which a $B_0$ magnetic field is directed and/or aligned), longitudinal axis 115*b* and axial axis 115*c* illustrate the orientation of RF coils and patient anatomy relative to the exemplary MRI system illustrated in FIG. 2 (see also FIG. 15B). When the flexible substrate is wrapped about the leg of the patient (e.g., to image the knee), the RF coils bend to closely follow the contours of the leg and are also positioned so that each coil is oriented so that some portion of the coil has surface normal vectors (a vector normal to the surface of the substrate at a given location) oriented orthogonal to the vertical axis 115*a* for optimal detection of MR signals emitted from the patient anatomy.

Figure 4:
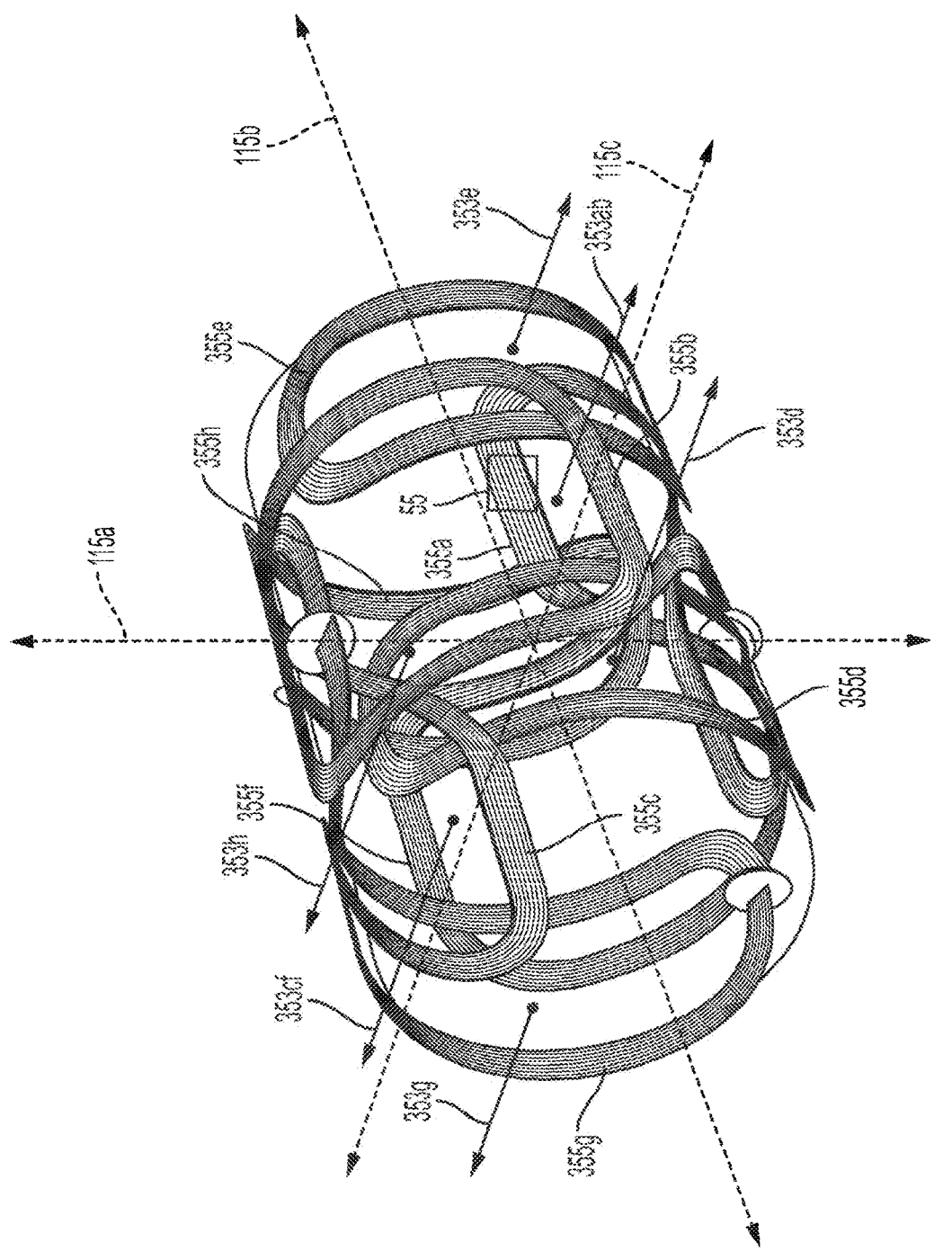
FIG. 4 illustrates a flexible radio frequency coil array, in accordance with some embodiments.

As an example, FIG. 4 illustrates a coil array similar to the coil array in FIG. 3 on which an example normal oriented substantially orthogonal to vertical axis 115*a* is labeled on each coil. Specifically, normal 353*ab* illustrates one example of a surface normal for RF coils 355*a* and 355*b* that is oriented substantially orthogonal to vertical axis 115*a* (i.e., parallel to axial axis 115*c*) that is optimally oriented to detect MR signals emitted from the patient. Similarly, normal 353*cf* illustrates one example of a surface normal for RF coils 355*c* and 355*f*, normal 353*d* illustrates one example of a surface normal for RF coil 355*d*, normal 353*e* illustrates one example of a surface normal for RF coil 355*e*, normal 353*g* illustrates one example of a surface normal for RF coil 355*g*, and normal 353*h* illustrates one example of a surface normal for RF coil 355*h*. It should be appreciated that each coil includes numerous such surface normal vectors as well as portions including surface normal vectors having significant components along the axial axis 115*c* that are also oriented to be responsive to MR signals emitted from the patient's anatomy.

Accordingly, the exemplary coil arrays illustrated in FIGS. 3 and 4 are capable of being positioned about the patient's anatomy (e.g., the leg, knee, etc.) and oriented so as to be responsive to MR signals emitted from a patient positioned with the imaging region of the exemplary $B_0$ magnet configuration illustrated in FIG. 2. As shown in the exemplary flexible RF apparatus illustrated in FIGS. 3 and 4, coils are positioned and arranged such that when the flexible substrate is wrapped about patient anatomy, the array of coils covers the entirety or substantially the entirety of the circumference of the patient anatomy. For example, any line drawn from the proximal side to the distal side of the flexible substrate about the circumference of the patient's leg will pass through the interior of at least one radio frequency coil in the array. In the exemplary embodiment illustrated in FIG. 3, the flexible RF coil component 370 comprises a connector 351*a* adapted to connect to socket 351*b* provided on base 350 to connect RF coil array 355 to electronics 385 housed within base 380. In other embodiments, an RF coil array is connected to electronics housed within the base by passing coil conductors through cooperating apertures formed through the flexible substrate of the RF coil component and the base, as discussed in further detail below.

Figure 5A:
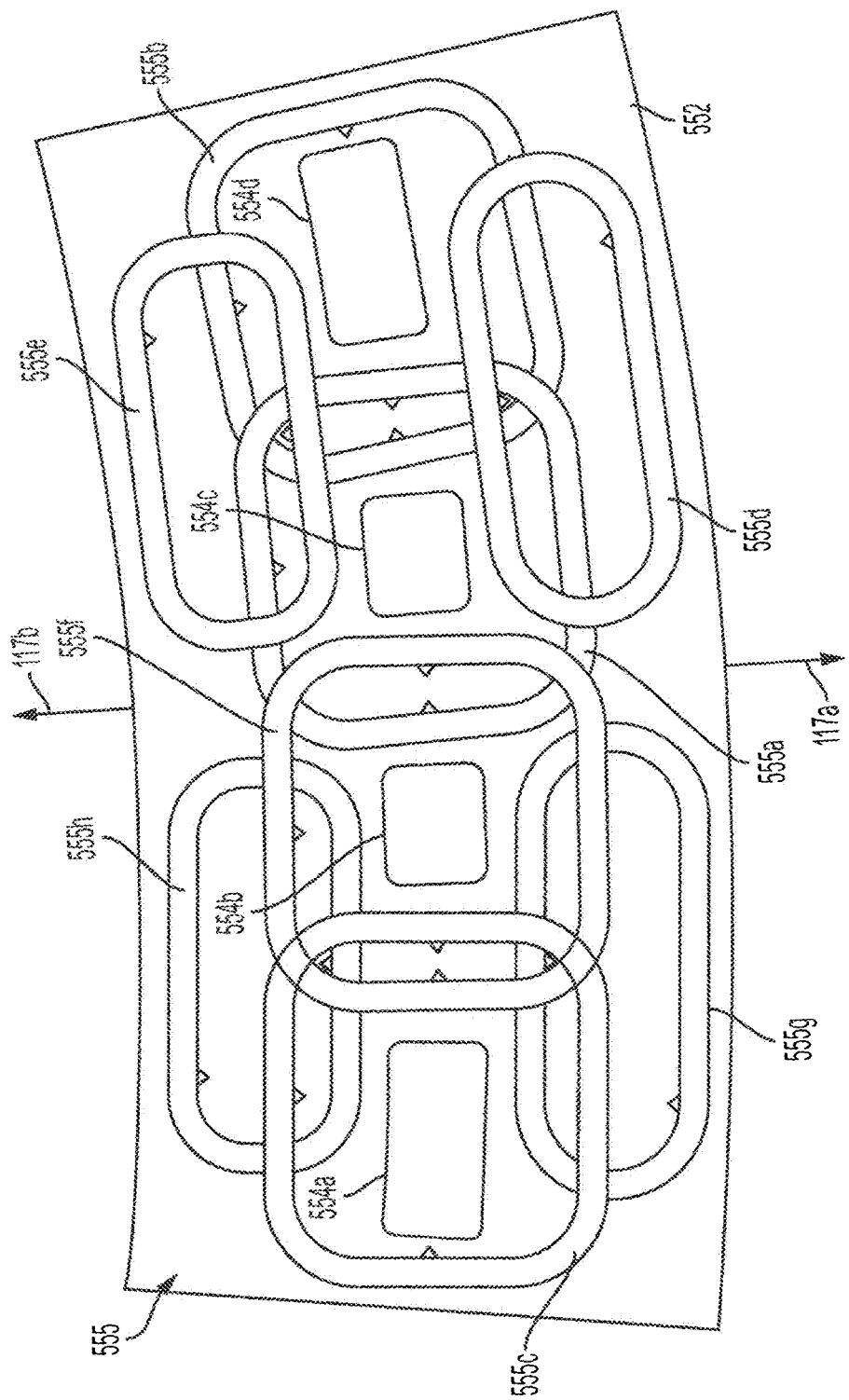
FIG. 5A illustrates a radio frequency coil array applied to a flexible substrate, in accordance with some embodiments.
Figure 5B:
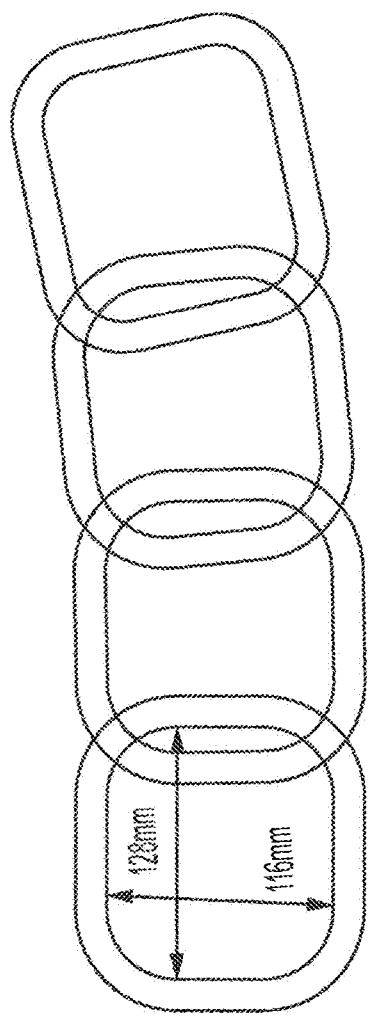
FIGS. 5B and 5C illustrate exemplary dimensions for a radio frequency coil array, in accordance with some embodiments.
Figure 5C:
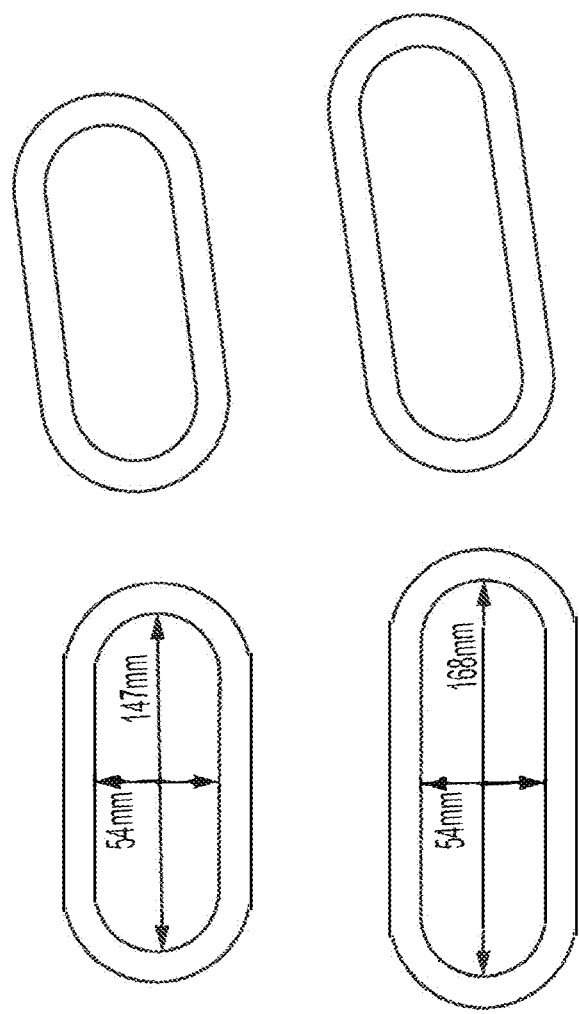

FIG. 5A illustrates an exemplary flexible RF coil array component (e.g., an RF coil array coupled to a flexible substrate) shown in an open position before the flexible RF coil component is wrapped about patient anatomy to illustrate further aspects of a flexible RF apparatus, in accordance with some embodiments. RF coil array 555 comprises eight RF coils 555*a-h* arranged in an overlapping relationship with one another. In the embodiment illustrated in FIG. 5, RF coil array 555 comprises four central RF coils (RF coils 555*a*, 555*b*, 555*c* and 555*f*) and four peripheral RF coils (proximal RF coils 555*d*, 555*g* and distal RF coils 555*e*, 555*h*) arranged such that each RF coil overlaps with at least two RF coils. Specifically, each central RF coil overlaps with one or more other central RF coils and two of the peripheral RF coils in a manner that reduces inductive coupling between the coils. It should be appreciated that different arrangements of coils may yield different overlaps and the aspects are not limited with respect to the extent and number of overlapping RF coils. Generally, to adequately mitigate inductive coupling, each RF coil will overlap with at least one other RF coil in the RF coil array.

Because RF coil array 555 is configured to operate in the low-field regime, the individual RF coils can have a significantly longer conductor lengths than conventional RF coils configured to operate in the high-field regime due to the lower resonant frequency involved in low-field MRI, as discussed above. In the illustrated example, central RF coils (RF coils 555*a*, 555*b*, 555*c* and 555*f*) may have dimensions on the order shown in FIG. 5B (e.g., a length in the longitudinal direction of 128 mm and a width in the axial direction of 116 mm). In exemplary coil array 555, the proximal RF coils (RF coils 555*d*, 555*g*) are larger than the distal RF coils (RF coils 555*e*, 555*h*) to account for the increased circumference of a human leg above the knee relative to the circumference of the leg below the knee. For example, the proximal RF coils may have dimensions on the order shown in FIG. 5C (e.g., a length in the longitudinal direction of 54 mm and a width in the axial direction of 168 mm) while distal RF coils may have dimensions on the order also shown in FIG. 5C (e.g., a length in the longitudinal direction of 54 mm and a width in the axial direction of 154 mm). It should be appreciated that the specific dimensions illustrated are exemplary and may be chosen to be smaller or larger. In the exemplary embodiment illustrated in FIGS. 5A-C, the coil dimensions were selected to cover the field of view of the target anatomy, but the aspects are not limited in this respect.

RF coils may be constructed from a conductor forming a single or multiple loops. For example, RF coils in coil array 555 may be formed by a layer of conductive material such as a conductive loop formed from a conductive sheet (e.g., a copper sheet) or a layer of conductive material that is milled, deposited, etched or otherwise provided in the desired shape of the coil. In some embodiments, the RF coils in a coil array may be include a number of turns of a conductor to improve the sensitivity of the RF coil. The turns of the conductor for an RF coil may be formed using any suitable technique, including using printed circuit board techniques where, for example, the desired number of turns of conducting material for each RF coil are etched from a layer of conductive material applied to a flexible substrate. According to some embodiments, the turns of an RF coil are formed by winding a conductor about a principal axis to form each coil using either a single strand of wire of suitable gauge or a multi-stranded wire (e.g., a Litz wire), as discussed in further detail below. As an example, the multiple conductor turns for the RF coils shown in FIG. 4 (see e.g., box 55 emphasizing the multiple conductor turns forming RF coil 355*a*) may be fabricated by etching or other suitable printed circuit board technique to define a plurality of conductor turns on a flexible substrate, or the multiple conductor turns may be provided by winding a single or multi-strand wire about the principal axis of the coil, examples of which are described in further detail below.

Substrate 552 may be any suitable material that allows the resulting RF coil array to flex and bend sufficiently to the contours of the target patient anatomy. For example, substrate 552 may be a constructed from a polyurethane foam material or the like. In the exemplary embodiment illustrated in FIG. 5A, cut-outs are formed in substrate 552 to provide an additional measure of flexibility to the resulting RF coil array component. For example, cut-outs 554a-d are provided through substrate 552 at locations in the middle of the central RF coils. According to some embodiments, cut-outs are omitted as illustrated in further examples described below.

Figure 6:
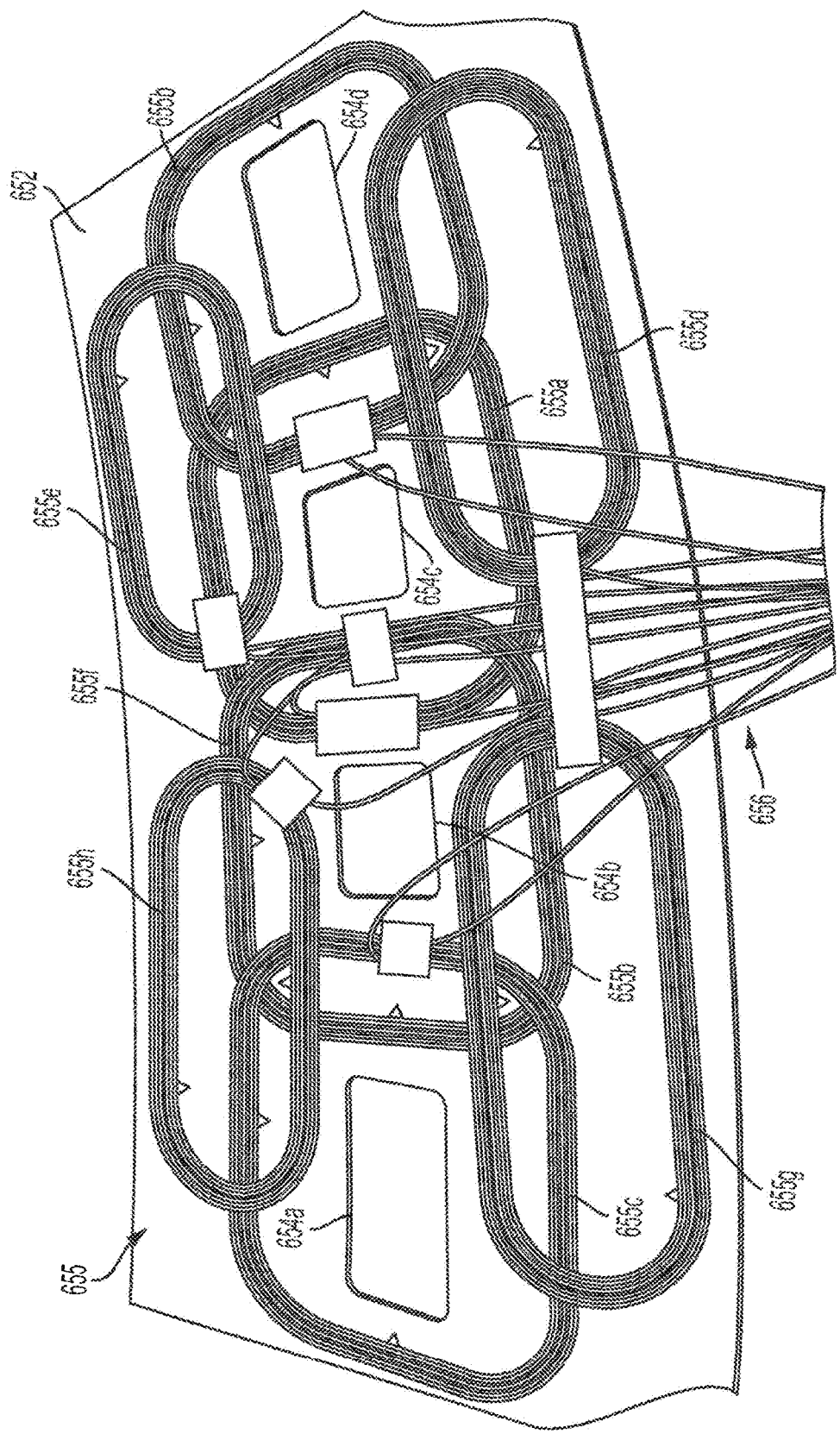
FIG. 6 illustrates a radio frequency coil array in which each radio frequency coil is formed by winding a conductor using a plurality of turns, in accordance with some embodiments.

FIG. 6 illustrates a RF coil array in which the RF coils include multiple turns of a conductor, in accordance with some embodiments. In FIG. 6, RF coil array 655 may be similar in some respects to RF coil array 555 illustrated in FIG. 5 in that the coil array is formed by a plurality of overlapping RF coils. In the exemplary embodiment illustrated in FIG. 6, each RF coil is formed by a conductor wound to provide a desired number of turns. For example, each RF coil may be formed using a single conductor (indicated generally by conductors 656 in FIG. 6) such as a wire that is wound a desired number of times about a principal axis of the respective RF coil. For exemplary RF coil array 655, the central RF coils (e.g., central RF coils 655a, 655b, 655c and 655f) each are provided with seven turns or loops and the peripheral RF coils (e.g., peripheral RF coils 655d, 655e, 655g and 655h) are provided with eight turns. However, any number of turns can be selected and the optimal number of turns may depend on the geometry of the RF apparatus (e.g., the type of patient anatomy the apparatus is configured to surround), the type of conductor and method of fabrication and/or desired operating characteristics of the RF coil array. Coil conductors 656 may be bundled and coupled to electronics of a flexible RF coil apparatus via, for example, a connector such as connector 351a illustrated in FIG. 3, or coupled to the electronics via cooperating openings or apertures in the flexible substrate and base, examples of which are discussed in further detail below.

Generally speaking, increasing the number of turns or loops of the coil conductor increases the sensitivity of the coil. However, at a certain point, increasing the number of turns may in fact degrade performance of the RF coil. In particular, a coil comprising multiple turns or loops will resonate without being tuned (self-resonate) at least partially due to a parasitic capacitance arising from the relationship of the conductor between the multiple turns or loops in the coil. The effect of the self-resonance is to reduce the Q-factor of the coil and degrading its performance. This effect may be particularly deleterious when the self-resonance approaches the frequency at which the RF coil is tuned to resonate (i.e., the target resonant frequency of the coil corresponding to the strength of the $B_0$ field of the MRI system, such as the Larmor frequency for hydrogen nuclear magnetic resonance). Because the frequency of the self-resonance decreases as the number of turns increases, this phenomenon may place an effective limit on the number of turns of the conductor before the coil performance degrades unsatisfactorily.

In the exemplary embodiment illustrated, RF coils in the coil array are dimensioned and arranged to cover the field of view of interest and to minimize inter-element coupling by overlapping the coils. The number of turns for the RF coils were selected to maximize the Q factor of each coil to improve SNR. In particular, the Q factor corresponds to the ratio of the total magnetic field energy in the RF coil to its energy loss per oscillation, and therefore optimizing the Q factor increases the coil sensitivity and reduces noise in acquired MR signals.

According to some embodiments, the number of turns of the conductor of the coil is limited to ensure that the frequency of the self-resonance is at least twice that of the frequency of the target resonance to which the RF coil is tuned. According to some embodiments, the number of turns of the conductor of the coil is limited to ensure that the frequency of the self-resonance is at least three times that of the frequency of the target resonance to which the RF coil is tuned, and according to other embodiments, the number of turns of the conductor of the coil is limited to ensure that the frequency of the self-resonance is at least five times that of the target resonance.

The limit on the number of turns needed to ensure that the frequency of the self-resonance is a desired distance away from the frequency of the target resonance depends on a number of factors, including the geometry and size of the coil (e.g., the geometry of a head coil may result in a different limit than the geometry of a leg coil to achieve the same separation of the self-resonance and target resonance frequencies), and the type of conductor being used (e.g., whether conductors are printed or wound, the gauge of the wire, whether the wire is single or multi-stranded, etc.). It should be appreciated that the limitation on the number of turns can be selected to be any number depending on the requirements of the RF coil array, including placing no limitation on the number of turns of the conductor of the coil.

As discussed above, in the embodiment illustrated in FIG. 6, each RF coil is formed using a single conductor (e.g., single or multi-stranded wire) wound about the principal axis of the coil. In this embodiment, the conductor length for each of the central RF coils is approximately 390 cm, the conductor length for each of the proximal RF coils is approximately 432 cm and the conductor length for each of the distal RF coils is approximately 380 cm. The conductor lengths above are merely exemplary and may be chosen to be any length suitable for providing RF coils having desired dimensions and/or a desired number of turns, as the aspects of the technology are not limited in this respect. Similar to the embodiment illustrated in FIG. 5A, substrate 652 includes cut-outs 654a-d to increase the flexibility of the coil, though the aspects are not limited in this respect.

In other exemplary embodiments, the conductor length for RF coils in an array are in a range between 100 cm to 1000 cm and may depend on the $B_0$ magnetic field strength of an MRI system for which the RF apparatus is configured to operate, the type of patient anatomy being targeted, the dimensions of and the number of turns in the respective RF coil, etc. As examples, the conductor length for RF coils in an array may be in a range between 100-600 cm, 200-500 cm, etc. According to some embodiments, the length of the conductor for a RF coil may be chosen to be any value between $1/10^{th}$ and $1/70^{th}$ of a wavelength of MR signals produced at a $B_0$ magnetic field strength at which a corresponding MRI system operates. Table 1 below illustrates exemplary conductor lengths for a number of different exemplary low-field $B_0$ magnetic field strengths, in accordance with some embodiments. It should be appreciated that according to some designs, conductor lengths may be chosen differently (e.g., less than $1/70^{th}$ of a wavelength of MR signals produced at a B0 magnetic field strength at which a corresponding MRI system operates).

TABLE 1

| $B_0$ Magnetic Field Strength | Conductor Length |
|---|---|
| .2T | 70-350 cm |
| .1T | 100-700 cm |
| .05T | 200-1400 cm |
| .02T | 400-2800 cm |

Figure 7:
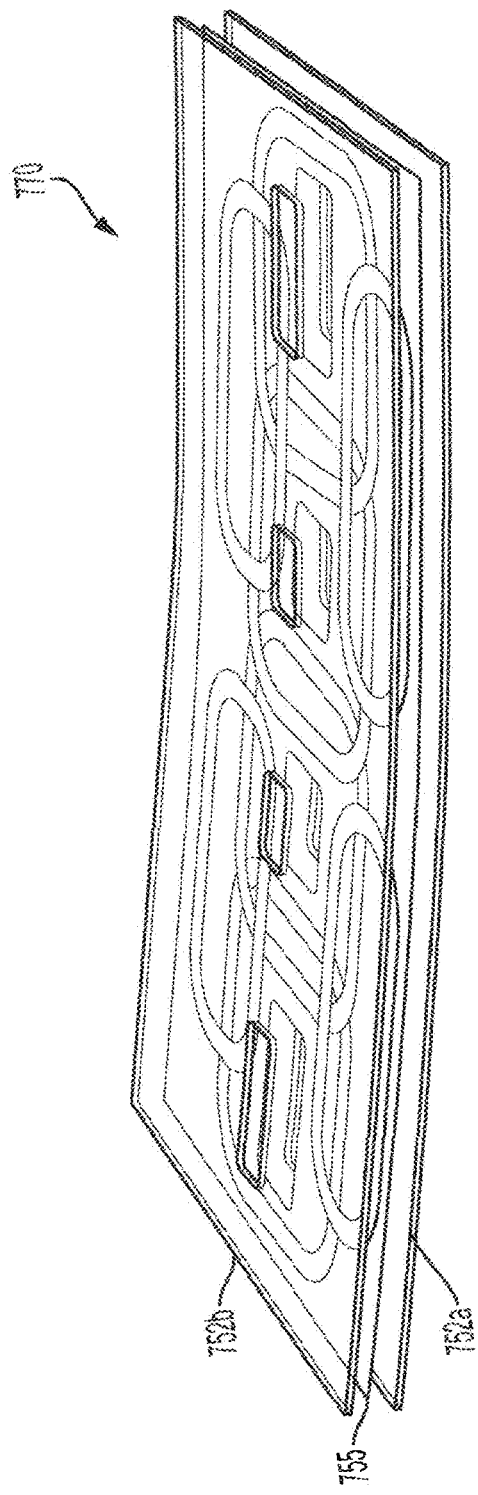
FIG. 7 illustrates a radio frequency coil array positioned between a plurality of layers of a flexible substrate, in accordance with some embodiments.

FIG. 7 illustrates an exemplary of construction of the flexible RF coil array portion of a flexible RF apparatus, in accordance with some embodiments. As discussed above, coupling an RF coil array to a flexible substrate allows the RF apparatus to be provided around patient anatomy to be imaged so as to generally fit to the contours of the anatomy. In the embodiment illustrated in FIG. 7, the flexible substrate comprises a plurality of layers including a bottom layer 752a and a top layer 752b. An RF coil array 755 is coupled to the flexible substrate by positioning the coil array between the bottom layer and the top layer and adhesing, affixing or otherwise attaching the top and bottom layer of the substrate together, examples of which are described in further detail below. RF coil array 755 is illustrated schematically to represent any of the exemplary RF coil arrays described herein (e.g., RF coil array 755 may include any number of RF coils having a single or a plurality of turns and fabricated using any suitable technique, such as printed coils or providing wound conductors using single or multi-stranded conductors), as any type of suitably flexible RF coil array may be coupled to a flexible substrate by sandwiching the coil array between a plurality of layers of a flexible substrate. The resulting flexible wrap 770 may then be coupled to a base and or otherwise connected to the electronic components of an MRI system to produce a flexible RF apparatus, examples of which are described in further detail below.

Figure 8A:
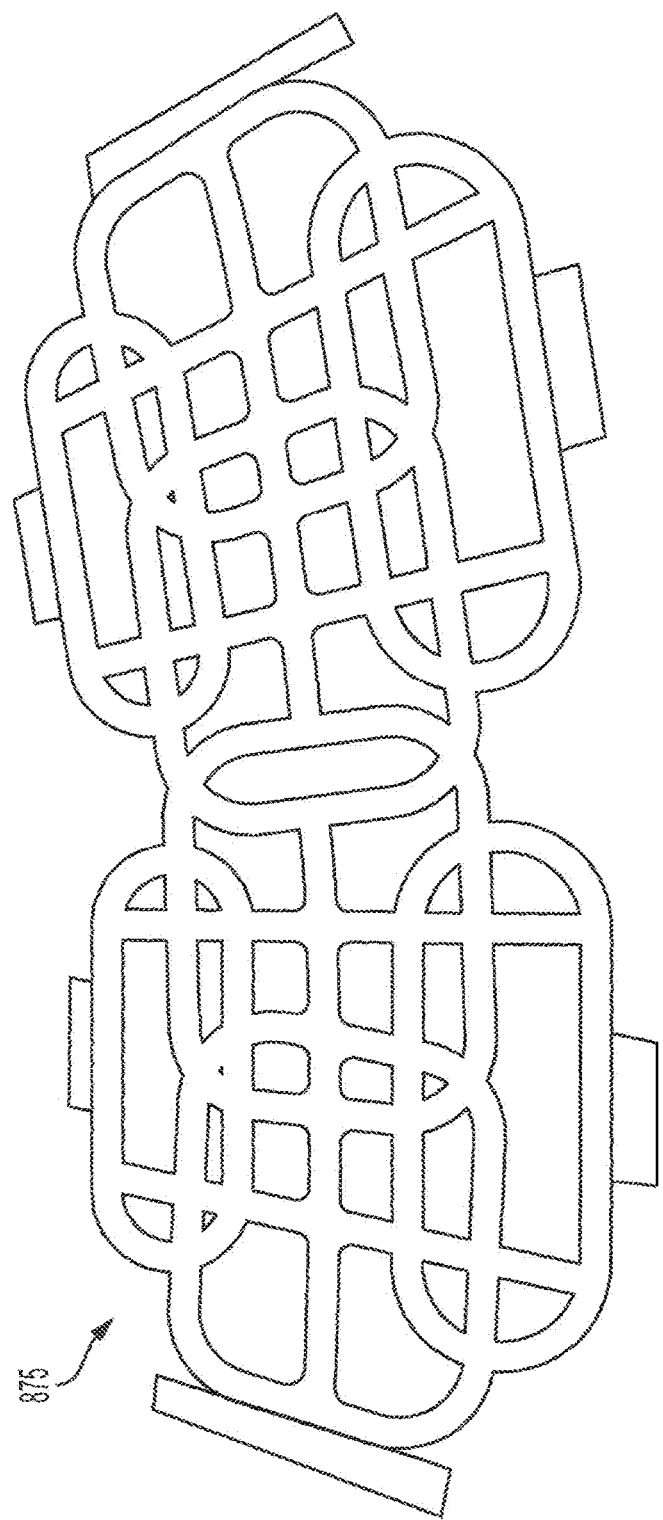
FIG. 8A illustrates an adhesive pattern to which a radio frequency coil array may be attached, in accordance with some embodiments.

FIGS. 8A-8E illustrate an exemplary construction of a flexible RF coil apparatus, in accordance with some embodiments. FIG. 8A illustrates an adhesive pattern to which an RF coil array may be affixed. For example, adhesive pattern 875 may be patterned from an adhesive sheet or layer according to the geometry of a desired RF coil array. While adhesive pattern 875 is configured for an RF coil array similar to the exemplary coil arrays discussed in connection with FIGS. 2-7 in that the coil array comprises a plurality of overlapping coils, an adhesive pattern may conform to any desired number and arrangement of RF coils, as the aspects are not limited to any particular geometry. Adhesive pattern 875 facilitates attaching an RF coil array to multiple layers of a flexible substrate.

Figure 8B:
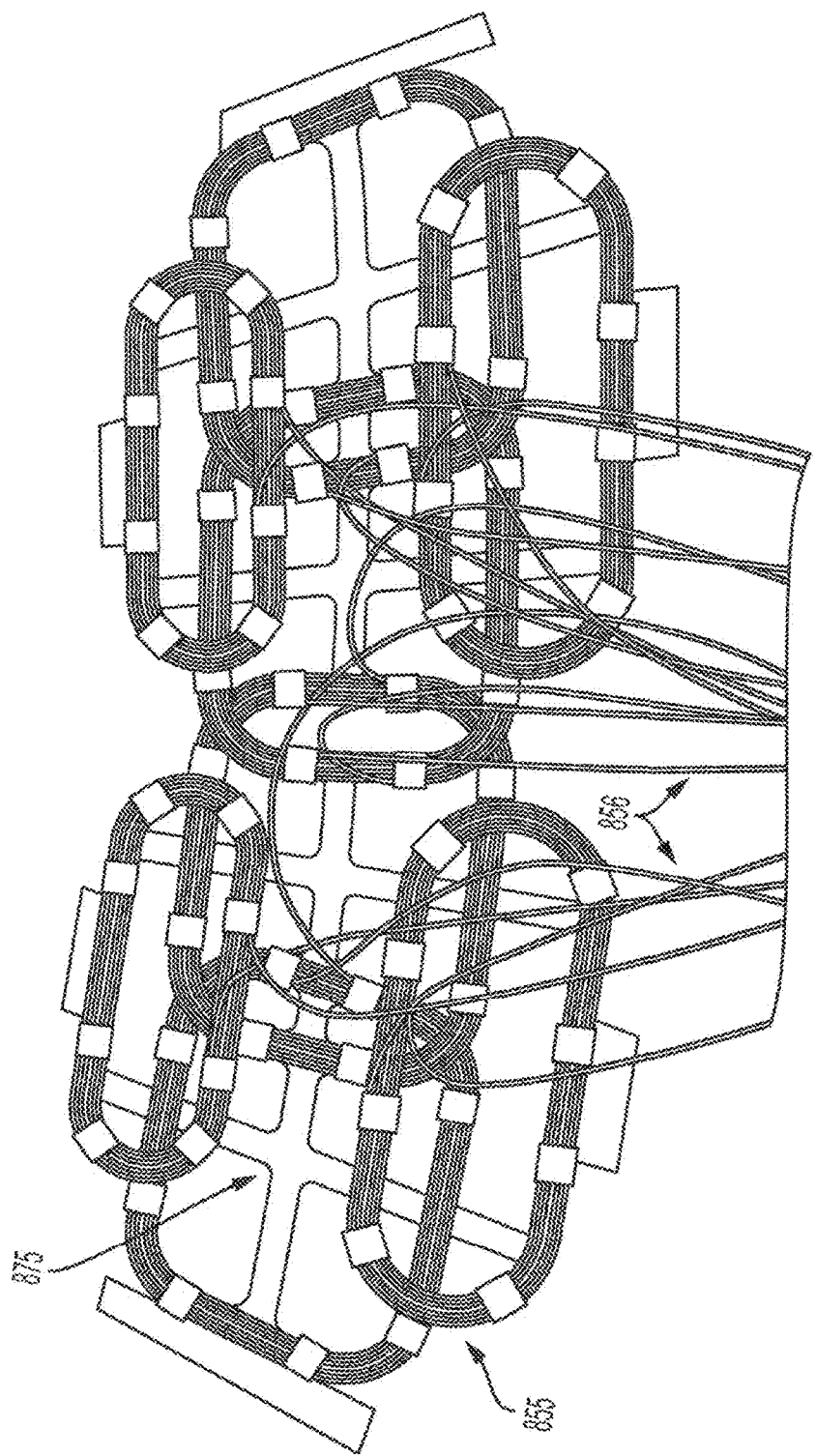
FIG. 8B illustrates an array of wound conductor radio frequency coils applied to the adhesive pattern illustrated in FIG. 8A, in accordance with some embodiments.

FIG. 8B illustrates an RF coil array 855 applied to adhesive pattern 875. In the exemplary embodiment illustrated in FIG. 8B, RF coil array 855 comprises eight RF coils, each RF coil being formed using a single conductor wound to include a plurality of turns. Specifically, in the embodiment illustrated in FIG. 8B, each of four central RF coils are provided by winding a multi-stranded Litz wire seven times about the respective principal coil axis (i.e., the normal vector through the center of the coil) and each of four peripheral coils are provided by winding a multi-stranded Litz wire eight times about the respective principal coil axis. The collection of conductors, denoted generally as conductors 856 in FIG. 8B, may then be connected to the electronics of the flexible RF apparatus (e.g., housed within a base of the RF apparatus, provided within the flexible RF coil component, etc.) which in turn may be connected to the electronics (e.g., the controller or console) of a low-field MRI system, as discussed in further detail in connection with FIGS. 9 and 10 for example.

Figure 8C:
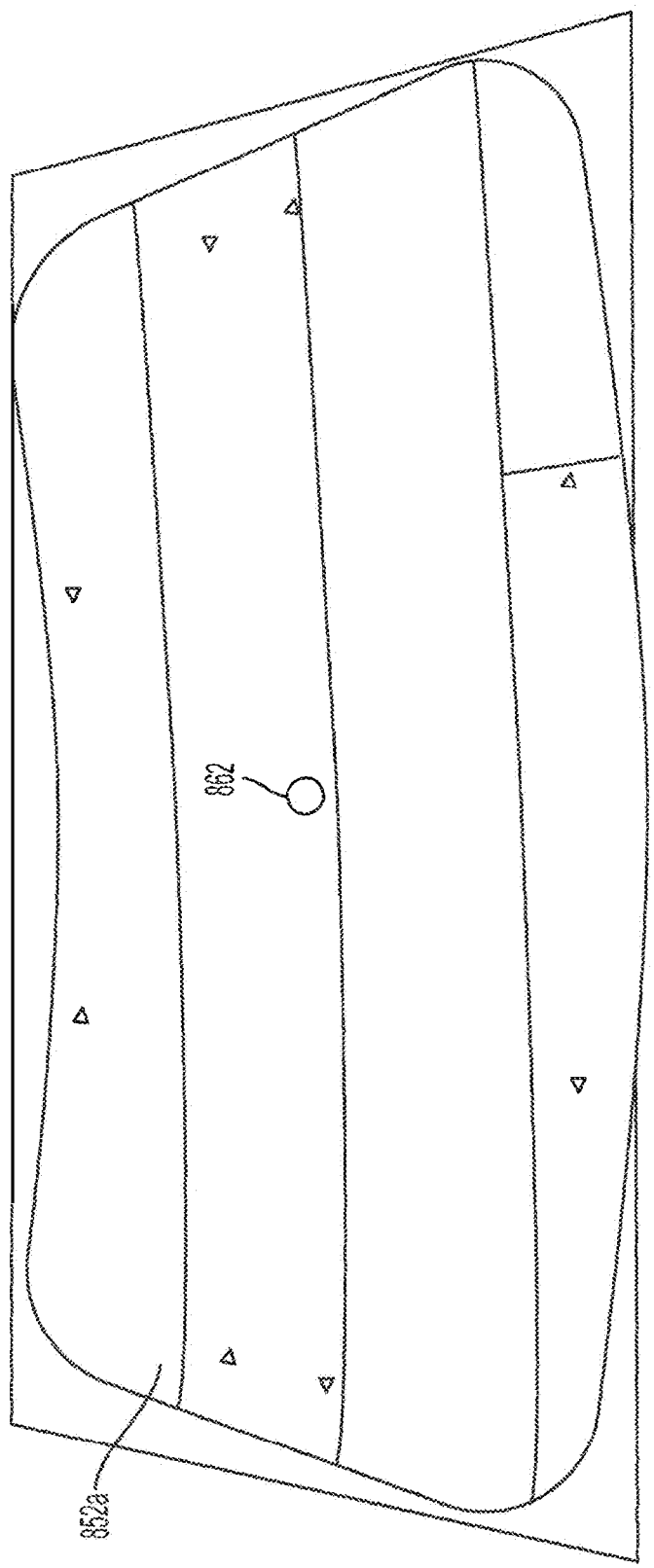
FIG. 8C illustrates a first layer of a flexible substrate, in accordance with some embodiments.
Figure 8D:
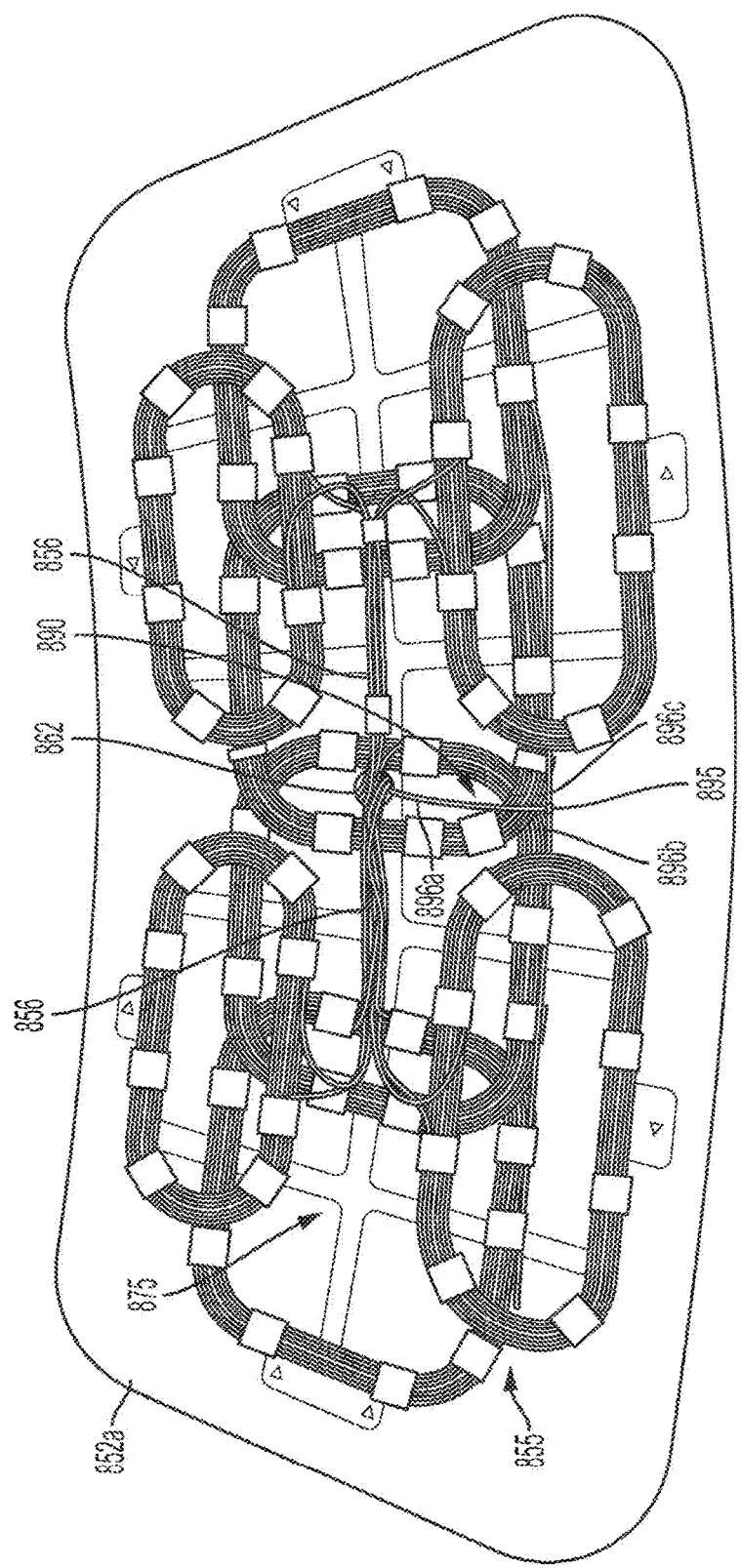
FIG. 8D illustrates the array of wound conductor radio frequency coils applied to the adhesive pattern illustrated in FIG. 8B positioned on the first layer of flexible substrate illustrated in FIG. 8C, in accordance with some embodiments.
Figure 8E:
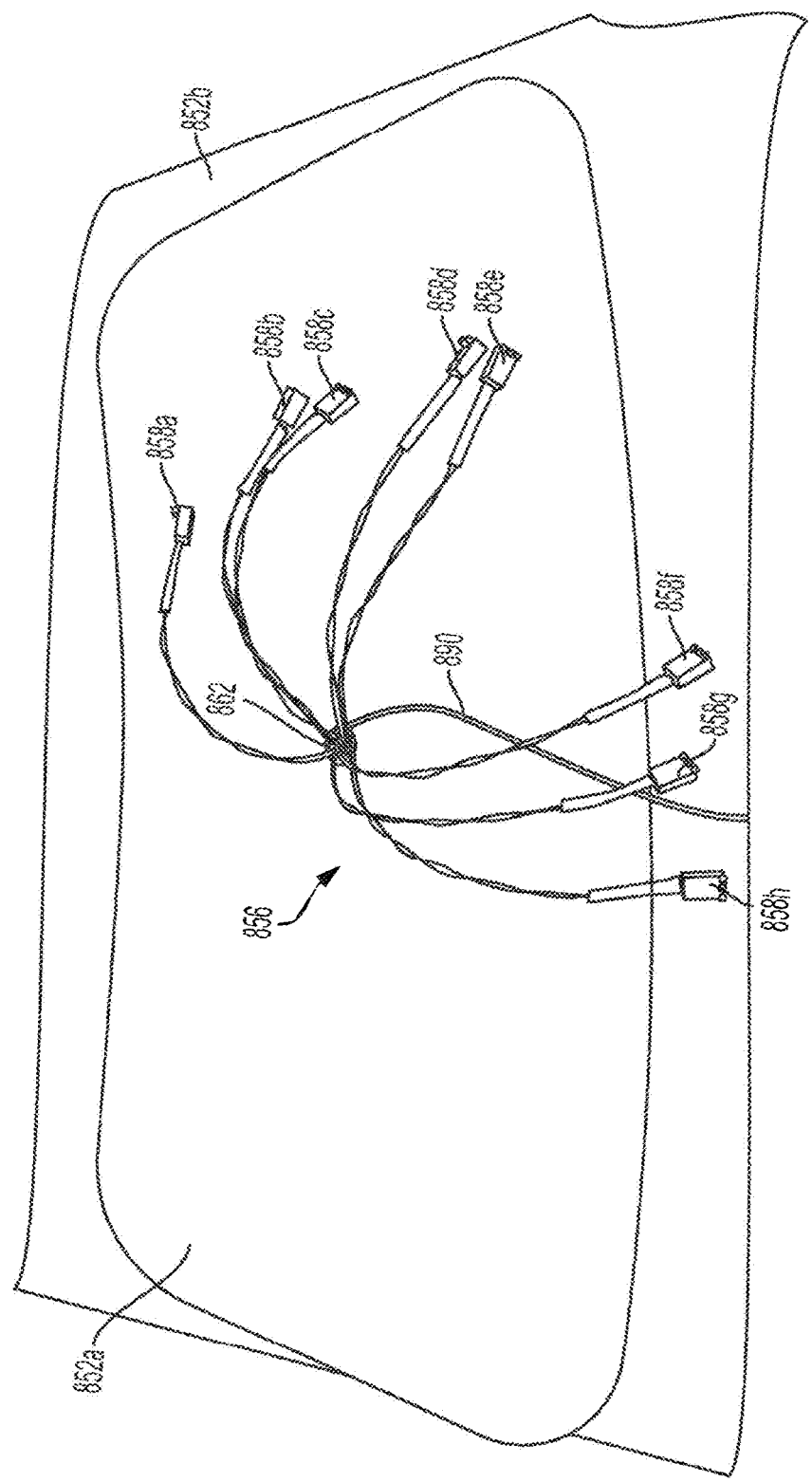
FIG. 8E illustrates the array of wound conductor radio frequency coils applied to the adhesive pattern and positioned on the first layer of flexible substrate illustrated in FIG. 8D positioned face down a second layer of a flexible substrate with the radio frequency coil conductors passed through an aperture for connection to electronics of the radio frequency coil apparatus, in accordance with some embodiments.

FIG. 8C illustrates a layer 852a of a flexible substrate to which RF coil array 855 may be applied. Layer 852a may be formed from any suitable flexible material such as a polyurethane foam sheet or other suitable material. Layer 852a further comprises a hole or aperture 862 through which conductors 856 from each of the coils are passed to allow for connection to the electronics of the flexible RF apparatus. FIG. 8D illustrates RF coil array 855 applied to layer 852a of the flexible substrate. As illustrated, the coil conductor for each of the RF coils in array 855 are gathered and passed through aperture 862 so that they are accessible for connection to the RF coil apparatus electronics as illustrated in FIG. 8E. As further shown in FIG. 8D, portions of adhesive pattern 875 remain exposed after application of RF coil array 855 to the adhesive pattern. These exposed portions facilitate attaching a further layer of flexible material over the coil array (see e.g., FIG. 8E).

The flexible RF coil component illustrated in FIG. 8D further includes an electric field sensor 890 positioned to couple to anatomy of the patient to detect electromagnetic radiation introduced by the patient. In the embodiment illustrated in FIG. 8D, electric field sensor 890 comprises three conductors 896a-c which may be provided by the same multi-stranded wire used as the conductors for the RF coils in the array or may be provided by a different type of conductor, as the aspects are not limited in this respect. Conductors 896a-c are positioned to couple to a patient's body (e.g., inductively or capacitively) and are connected at junction 895. Conductor 896a is passed through aperture 862 for connection to the RF coil apparatus electronics so that interference signals (detected electromagnetic radiation introduced by the patient) can be provided to the MRI system to reduce noise introduced by the patient (e.g., so that electric field sensor 890 can be connected to circuitry configured to receive detected electromagnetic radiation and to suppress and/or compensate for the detected electromagnetic radiation in magnetic resonance imaging signals detected by the flexible RF apparatus). Electric field sensor 890 may be, for example, similar to any of the exemplary electric field sensors described in U.S. application Ser. No. 17/065,344 titled "System and Methods for Detecting Electromagnetic Interference in Patients During Magnetic Resonance Imaging," and filed on Oct. 7, 2020, which application is herein incorporated by reference in its entirety.

FIG. 8E illustrates the outward facing side of layer 852a (the inward facing side of which is illustrated in FIGS. 8C and 8D) of the flexible substrate through which the conductors 856 from each of the RF coils and a conductor for electric field sensor 890 have been passed through aperture 862. In the embodiment illustrated in FIG. 8E, the ends of each RF coil conductor are inserted into respective connectors 858a-858h configured to connect to the electronics of the flexible RF apparatus, as discussed in further detail below in connection with FIGS. 9 and 10. The conductor of electric field sensor 890 may also be provided with a connector (not shown) to connect to the RF coil apparatus electronics to provide interference information to the MRI system, or the electric field sensor conductor may be directly connected (e.g., via soldering) to the electronics. In FIG. 8E, layer 852a has been laid coil-side down on a second layer 852b to sandwich the RF coil between to the two flexible substrate layers 852a and 852b. The exposed portions of adhesive layer 875 visible in FIG. 8D may assist in attaching the two layers together. Flexible substrate layer 852*b* may be shaped as layer 852*a* to provide the flexible RF coil array component for the RF apparatus. It should be appreciated that the RF coil array and the flexible substrate layers may be attached using any suitable technique or techniques, as the aspects are not limited to any particular technique for manufacturing a flexible RF coil array component.

Figure 8F:
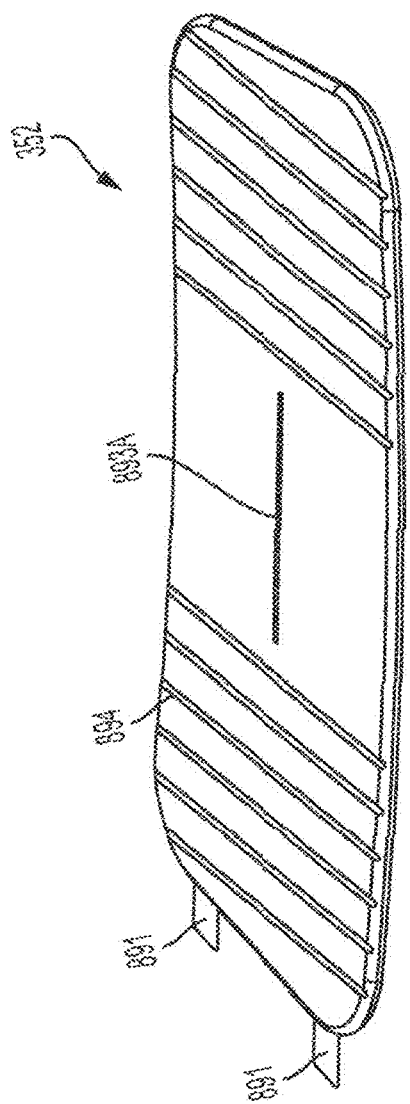
FIGS. 8F-8G illustrate additional features of the flexible substrate of the flexible radio frequency coil apparatus, in accordance with some embodiments.
Figure 8G:
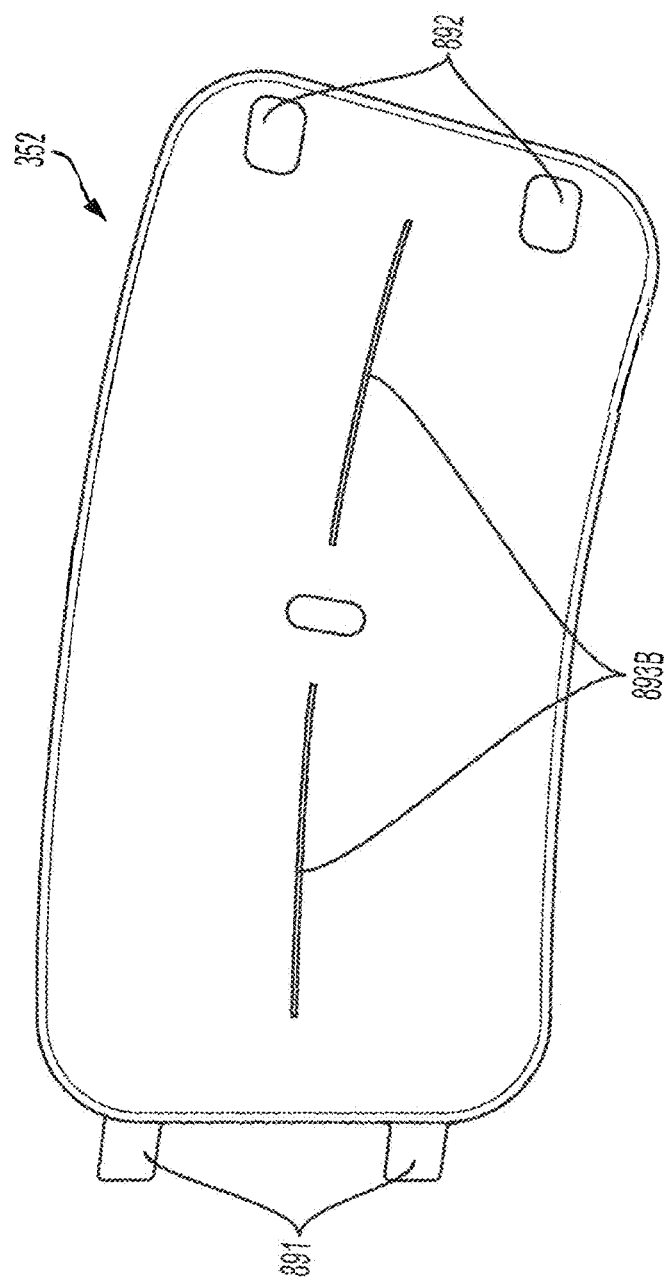

FIGS. 8F-8G illustrate additional features of the flexible substrate of the flexible radio frequency coil apparatus, in accordance with some embodiments. FIG. 8F shows an exterior of the flexible substrate 352. FIG. 8G shows an interior of the flexible substrate 352, which, when the flexible substrate is positioned about a patient anatomy, faces the patient anatomy.

Figure 8I:
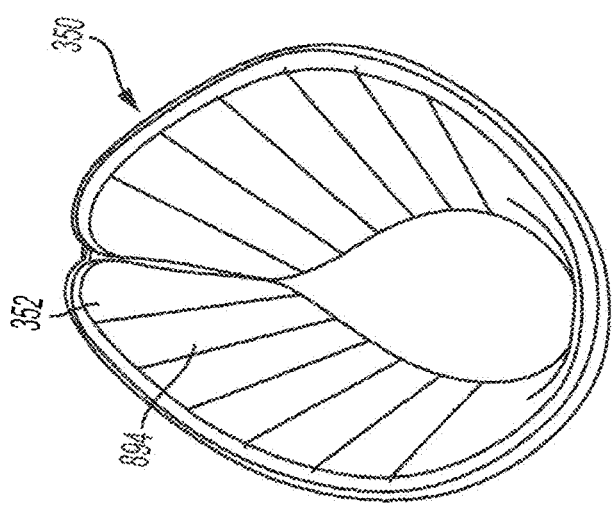
FIGS. 8H-8I illustrate the flexible radio frequency coil apparatus in a closed configuration, in accordance with some embodiments.
Figure 8H:
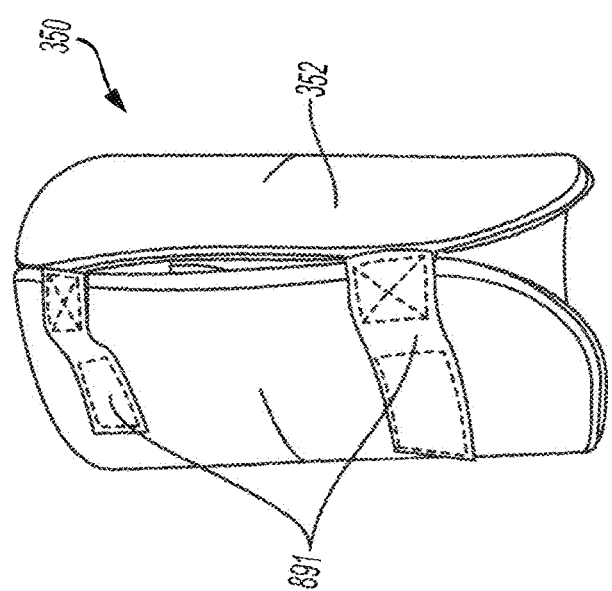

As shown in FIGS. 8F-8G, the flexible substrate 352 may comprise one or more tabs 891. The one or more tabs 891 may comprise an adhesive (e.g., a hook and loop fastener) which couples to one or more second points (e.g., recesses 892) on the flexible substrate 352 allowing the flexible substrate to be wrapped and secured around the patient anatomy. For example, FIGS. 8H-8I illustrate the flexible radio frequency coil apparatus 350 in a closed configuration, in accordance with some embodiments. As shown in FIGS. 8H-8I, the flexible substrate 352 is folded and tabs 891 may be coupled to second points 892 of the flexible substrate 352.

In some embodiments, the flexible substrate 352 may comprise one or more grooves 894. The one or more grooves 894 may comprise indentations in the flexible substrate 352 which increase the flexibility of the flexible substrate 352 by allowing the flexible substrate 352 to fold more easily.

In some embodiments, the flexible substrate 352 may comprise one or more ridges 893A-B. The one or more ridges 893A-B may be portions of the flexible substrate 352 which provide a visual and/or tactile indicator of a particular point on the flexible substrate 352. For example, the one or more ridges 893A-B may, in some embodiments, be positioned at a midpoint of the flexible substrate 352 to assist in positioning the patient's anatomy within an imaging region of an MRI device even when the patient anatomy is not visible due to being covered by the flexible substrate 352. In some embodiments, the one or more ridges 893A-B comprise raised portions of the substrate. However, the one or more ridges may take any suitable form.

Figure 9:
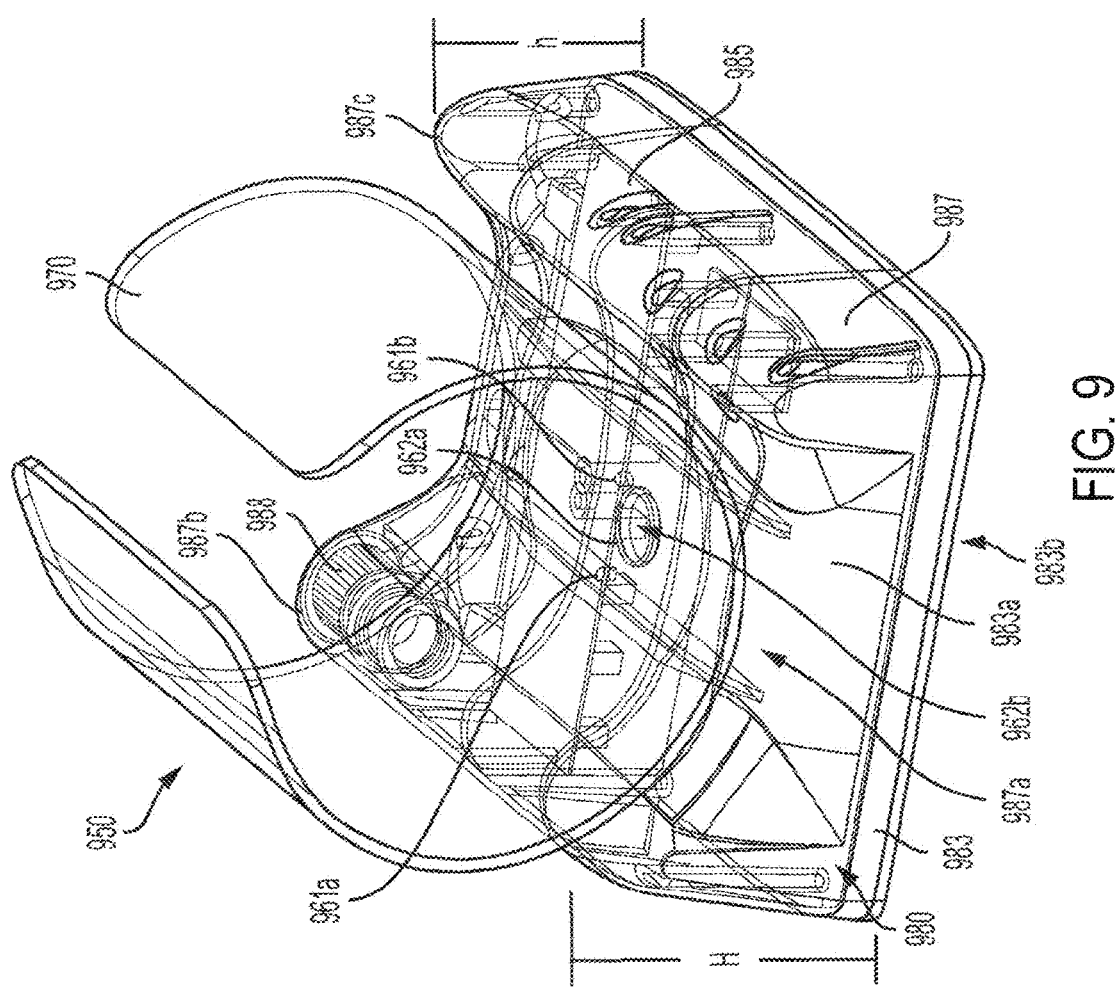
FIG. 9 illustrates a flexible radio frequency coil apparatus, in accordance with some embodiments.

FIG. 9 illustrates a flexible RF apparatus 850 comprising a flexible RF coil array component 970 mounted on a rigid base 980, in accordance with some embodiments. Flexible RF coil array component 970 may be, for example, similar to the flexible RF coil array described in connection with FIGS. 8A-8E in which an array of RF coils are provided between a plurality of flexible substrate layers. FIG. 9 is intended to illustrate an exemplary relationship between a flexible RF coil array component and a base. As such, the RF coils themselves are not depicted, but it should be understood that flexible RF coil array component 970 may include any of the RF coil arrays described herein.

Base 980 comprises a platform portion 983 having a top side 983*a* on which RF coil apparatus electronics (e.g., electronics 985) are mounted or otherwise secured and a bottom side 983*b* having a securing mechanism (e.g., a releasable securing mechanism as described below in connection with FIGS. 14A and 14B) configured to releasably attach base 980 to a member (e.g., member 1569 illustrated in FIG. 15B) secured within the imaging region of the MRI system using any of the techniques described in the '896 patent discussed above. Base 980 further comprises a support portion 987 attached to platform portion 983 to provide support for flexible RF coil component 970 and patient anatomy positioned therein, and to provide a protective housing for internal electronics 985 of the RF apparatus 950. Exemplary support portion 987 includes a cradle portion 987*a* on which patient anatomy being imaged rests when placed with RF coil component 970 and shoulder portions 987*b* and 987*c* that facilitate holding the patient anatomy in place during imaging. In the exemplary embodiment illustrated in FIG. 9, shoulder portion 987*c* is lower than shoulder portion 987*b* to facilitate positioning of the patient anatomy into apparatus 950 so that the RF coil array component 970 can be secured about the anatomy. For example, the height from the bottom of the base to the ridge that forms the top of the shoulder is less for shoulder portion 987*c* than for shoulder portion 987*b* (e.g., h<H in the exemplary embodiment illustrated in FIG. 9).

Figure 13B:
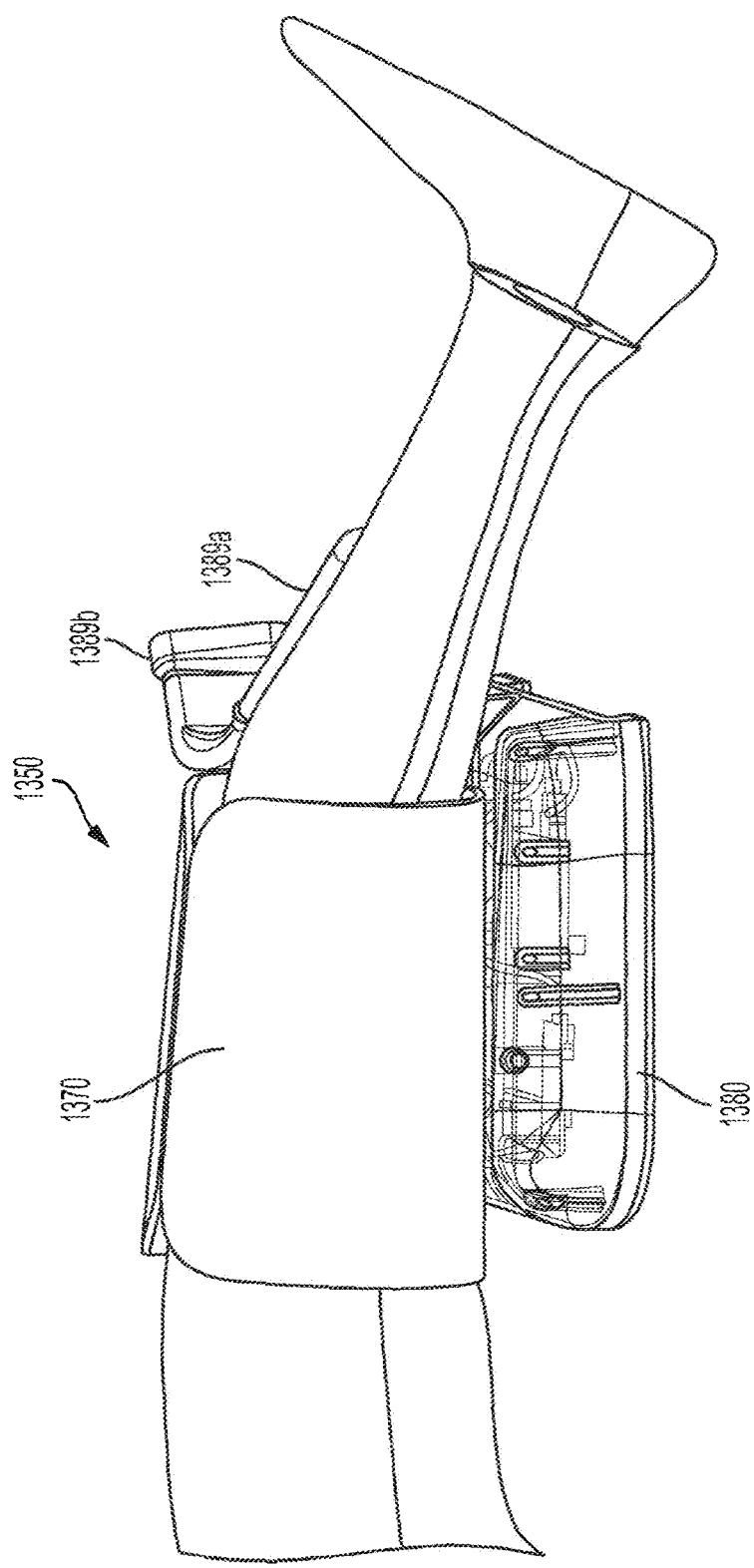

As discussed in connection with FIGS. 8A-E, at least one layer of a flexible substrate of flexible RF coil component 970 includes an aperture, shown as aperture 962*a* in FIG. 9, through which RF coil conductors (and electric field sensor conductor(s) when present) are passed to connect to the electronics of the RF apparatus. Support portion 987 includes a corresponding aperture 962*b* so that the coil conductors can be passed through to the inside of the housing to connect to electronics 985 therein. Electronics 985 may include any electronic components used to receive, process and/or provide electrical signals from the RF coils and/or an electric field sensor component. For example, electronics 985 may include connectors configured to receive the coil connectors (e.g., RF coils connectors 858*a-h* illustrated in FIG. 8E) and one or more linear amplifiers to amplify electrical signals from the RF coils and/or electric field sensor before delivering the signals to further electronic components of the MRI system. To electrically connect RF coil apparatus 950 to the electronics of an MRI system, base 980 may include, for example, a connector socket 988 into which a connecting component can be attached that allows a wire or cable bundle to connect with a cooperating connector socket on the MRI system to exchange signals, provide power and/or otherwise electrically connect the flexible RF apparatus 950 to a corresponding MRI system for which the apparatus is configured to operate, an example of which is illustrated in FIGS. 13A and 13B discussed below.

Figure 10:
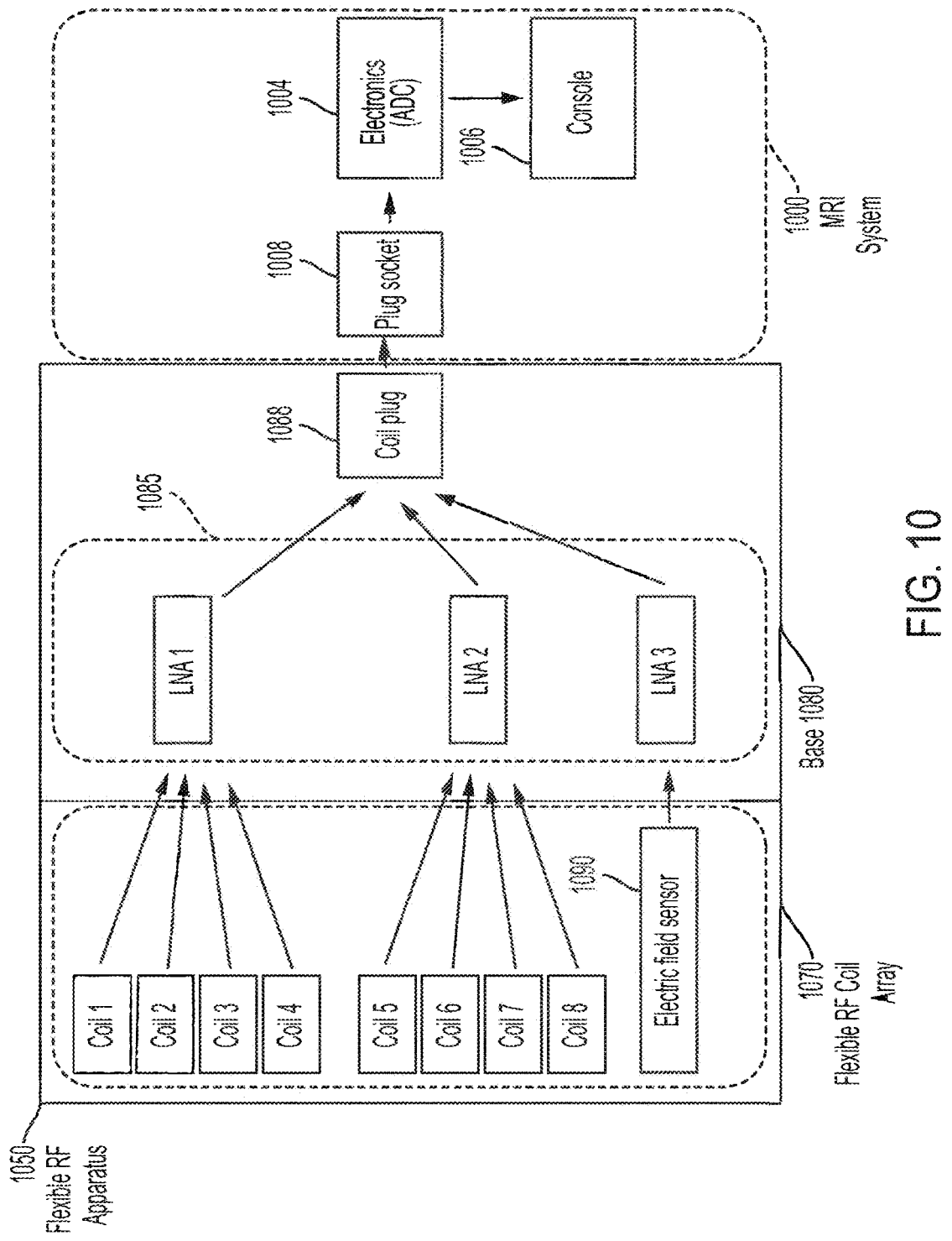
FIG. 10 is a schematic showing electrical connections between a radio frequency coil array and electronics of a flexible radio frequency coil apparatus and electronics of a magnetic resonance imaging system, in accordance with some embodiments.

FIG. 10 illustrates a block diagram schematically illustrating electrical connections and electrical components of an exemplary flexible RF coil apparatus and an MRI system for which the apparatus is configured to operate, in accordance with some embodiments. In the exemplary embodiment illustrated in FIG. 10, flexible RF apparatus 1050 comprises a flexible RF coil array component 1070 having a plurality of RF coils (e.g., coils 1-8) configured and arranged according to any of the techniques described herein, and an electric field sensor 1090 to detect electromagnetic interference introduced by the patient. RF apparatus 1050 further comprises a base 1080 configured to supported flexible RF coil array component 1070 and to house electronics, including a plurality of amplifiers (e.g., LNAs 1-3) configured to amplify MR signals detected by the coil array and interference signals received by electric field sensor 1090, and any other electronics provided to process received signals and/or provide signals to and/or from an attached MRI system. To this end, base 1080 further comprises plug 1088 by which RF coil apparatus 1050 is electrically connected to MRI system 1000 via plug socket 1008. Signals received via this connection may be provided to electronics 1004 of the MRI system (including one or more analog-to-digital-converters) and provided to console 1006 for processing to generate one or more MRI images of target patient anatomy.

Figure 11A:
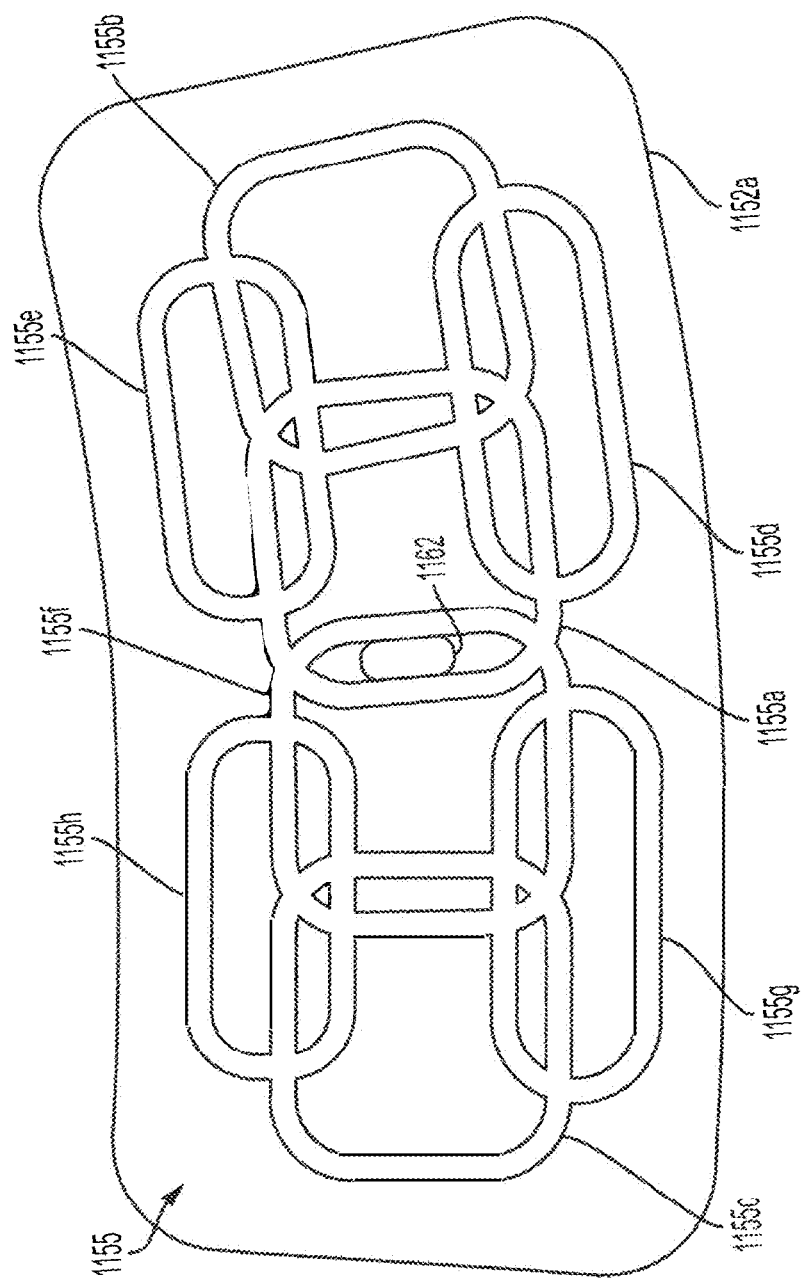
FIGS. 11A and 11B illustrate aspects of a flexible radio frequency coil component, in accordance with some embodiments.
Figure 11B:
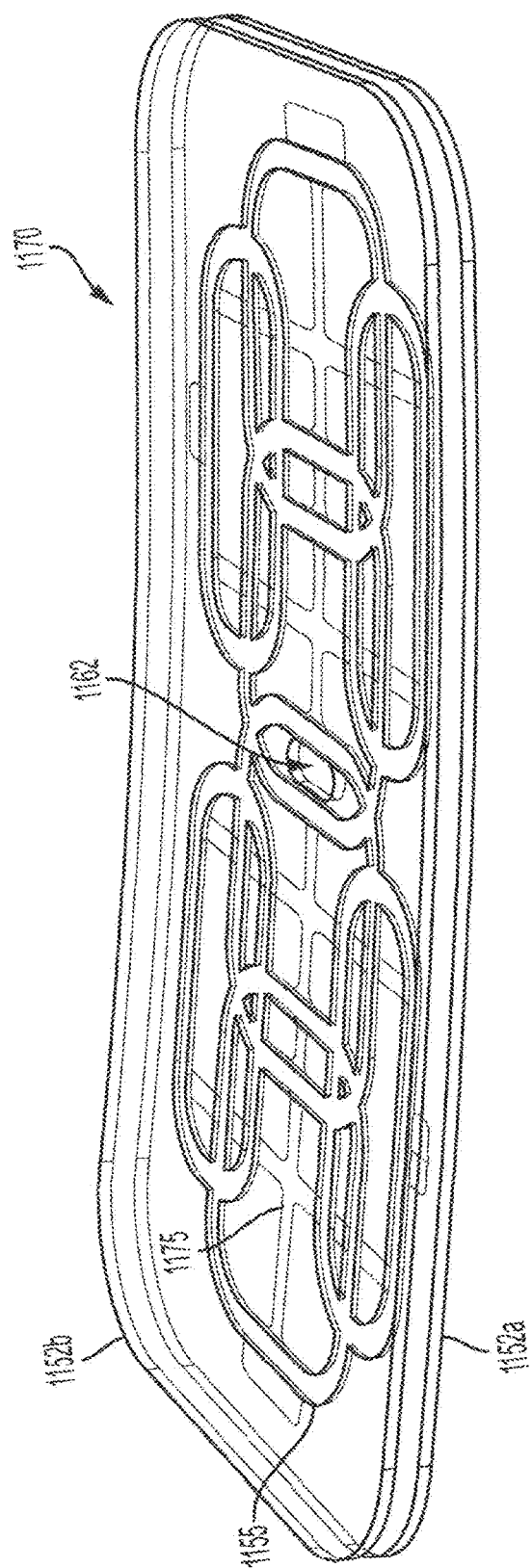

FIGS. 11A and 11B illustrate portions of a flexible RF coil component, in accordance with some embodiments. In particular, FIG. 11A illustrates an RF coil array 1155 comprising a plurality of central RF coils (e.g., central RF coils 1155*a*, 1155*b*, 1155*c* and 1155*f*) and a plurality of peripheral RF coils (e.g., proximal RF coils 1155*d* and 1155*g* and distal RF coils 1155*e* and 1155*h*) applied to a flexible substrate layer 1152*a*. RF coil array 1155 may be designed and constructed using any of the techniques described herein. In the exemplary embodiment illustrated in FIG. 11A, flexible substrate layer 1152*a* includes an elliptical aperture 1162 that allows RF coil conductors to pass through the flexible substrate so that the conductors are accessible external to the flexible RF coil component. FIG. 11B illustrates RF coil array 1155 applied to flexible substrate layer 1152*a* via adhesive pattern 1175 with flexible substrate layer 1152*b* applied over RF coil array 1155 to form a flexible RF coil component that can be electrically coupled to a base by passing RF coil conductors through aperture 1162 and a cooperating aperture in the base (e.g., the circular aperture illustrated in FIG. 9, the elliptical aperture illustrated in FIG. 13A, etc.) to connect to electronics housed within the base.

As discussed in connection with FIGS. 9, 11A and 11B cooperating apertures in the substrate of the flexible RF coil array and the base allow conductors of the RF coil array to be connected to the electronics of the RF coil apparatus. FIGS. 12A and 12B illustrate an interface component configured for insertion into corresponding apertures and through which RF coil and electric field sensor conductors can be passed. In particular, interface component 1200 includes an insert 1230 configured for an aperture in the substrate of the flexible RF coil array component and receptacle 1240 configured for a corresponding an aperture in the base (e.g., the base housing) and adapted to accommodate insert 1230.

Insert 1230 comprises a brim 1232 portion dimensioned to prevent the brim from passing through the aperture of the flexible RF coil component, a body portion 1234 dimensioned to allow passage of the body through the aperture, and insert aperture 1235 that passes through both brim 1232 and body 1234 to allow conductors to pass through the aperture of the flexible RF coil component (e.g., flexible RF coil component 970 illustrated in FIG. 9). As an example, prior to attaching a bottom and a top layer of a flexible substrate together, insert 1230 may be inserted into the substrate aperture in the flexible RF coil array component. Brim 1232 prevents the insert from completely passing through the aperture so that brim 1232 is positioned internal to the flexible RF coil component when the layers of the substrate are attached, and body 1234 is positioned external to the flexible RF coil array component. Also prior to attaching the layers of the substrate together, RF coil and electric field conductors are passed through insert aperture 1235 so that the conductors are accessible external to the flexible RF coil array component (e.g., flexible RF coil array component 970 illustrated in FIG. 9). In addition to facilitating correct placement of insert 1230, brim 1232 may also provide a measure protection against moisture getting into the flexible RF coil component (e.g., between the layers of the flexible substrate).

Similarly, receptacle 1240 comprises a lip 1242 dimensioned to prevent the lip from passing through the aperture in the base, a body portion 1244 dimensioned to allow passage of the body through the base aperture and configured to accommodate body 1234 of insert 1230, and receptacle aperture 1245 that passes through both lip 1242 and body 1244 and aligns with aperture 1235 so that the conductors passing through aperture 1235 can also pass through aperture 1235 to the internal space of the base to connect with the electronics of the RF coil apparatus. Insert 1230 and receptacle 1240 may also include cooperating portions 1236 (e.g., 1236*a* and 1236*b*) and 1246 (e.g., 1246*a* and 1246*b*) that allow the insert and the receptacle to be fastened together. For example, portions 1236*a*/1236*b* and 1246*a*/1246*b* may include screw holes 1237*a*/1237*b* and 1247*a*/1247*b*, respectively, that align when the insert is positioned in the receptacle so that interface 1200 can be screwed together. Thus, interface 1200 provides a passage for the RF coil and/or electric field sensor conductors from inside the flexible coil component through the housing of the base to the internal electronics.

FIG. 13A illustrates a flexible RF apparatus 1350 that may share one or more aspects of flexible RF apparatus 950 illustrated in FIG. 9. In the exemplary embodiment illustrated in FIG. 13A, cooperating apertures through flexible RF coil component 1370 and house 1387 of base 1380 are elliptical in shape to form elliptical passage 1362 from internal to flexible RF coil component 1370 to internal to housing 1387 to allow RF coil conductors, and electric field sensor conductor(s) when present, to be connected to electronics housed within the base. FIG. 13A also illustrates an interface component 1300, which may be the same or similar to interface component 1200 illustrated in FIGS. 12A and 12B, positioned within the cooperating apertures of flexible RF coil component 1370 and housing 1387 to provide an interface to facilitate electrically coupling the flexible RF coil component to electronics housed within the base.

As discussed in connection with FIGS. 9 and 10 (see e.g., connector socket 988 and coil plug 1088, respectively, a socket or plug may be provided in the base housing to facilitate electrically coupling the flexible RF apparatus to a low-field MRI device. The exemplary flexible RF apparatus 1350 comprises a connecting component 1389, coupled to socket 1388, comprising flexible connector 1389*a* and plug 1389*b* configured to connect to a plug socket of the MRI device (e.g., plug socket 1008 illustrated in FIG. 10). In this way, flexible RF apparatus 1350 can be electrically coupled to the MRI device for which the apparatus was configured to operate. FIG. 13B illustrates exemplary flexible RF apparatus 1350 after it has been wrapped about patient anatomy being supported by the base, in accordance with some embodiment.

As discussed above, the base of a flexible RF apparatus may include a bottom side (see e.g., bottom side 983*b* in FIG. 9 and bottom side 1183 in FIG. 11A) provided with a releasable mechanism that allows mechanical coupling of a flexible RF apparatus (e.g., flexible RF apparatus 950 or 1150 illustrated in FIGS. 9 and 11A and 11B, respectively) to an MRI system. FIGS. 14A and 14B illustrate an exemplary releasable mechanism that can be provided on the bottom side of a base to facilitate securing a flexible RF apparatus within the imaging region of the MRI system to position the patient for imaging, in accordance with some embodiments. In particular, FIG. 14A illustrates the underside of a base 1483*b* (which may correspond, for example, to the underside 983*b*/1183 of base 980/1180 illustrated in FIGS. 9 and 11A) equipped with a releasable securing mechanism 1435 configured to engage with and grip a member 1429 attached to the MRI system. To illustrate the function of the releasable mechanism, member 1429 is shown unattached, but it should be appreciated that surface 1429' is attached to the MRI system at a location such that when releasable mechanism 1435 is secured to member 1429, the flexible RF coil component is positioned within the imaging region of the MRI system (see member 1529 attached to MRI system 1500 in FIG. 15A). Member 1429 may include a smaller diameter portion 1429a and a larger diameter portion 1429b configured to cooperate with releasable securing mechanism 1435 to secure the base of an RF apparatus to the MRI system, as discussed in further detail below.

Figure 14A:
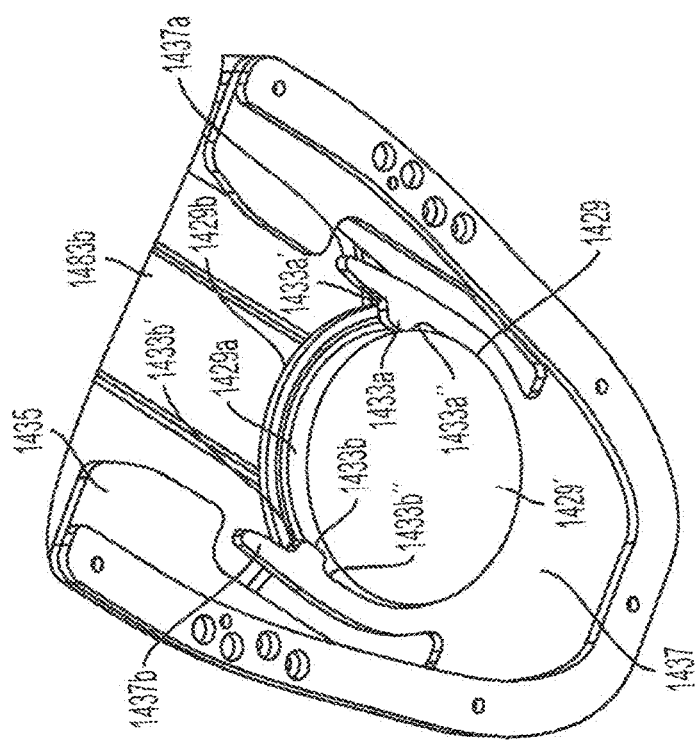
FIGS. 14A and 14B illustrate a releasable mechanism configured to mechanically couple the base of a flexible radio frequency coil apparatus to a magnetic resonance imaging system, in accordance with some embodiments.
Figure 14B:
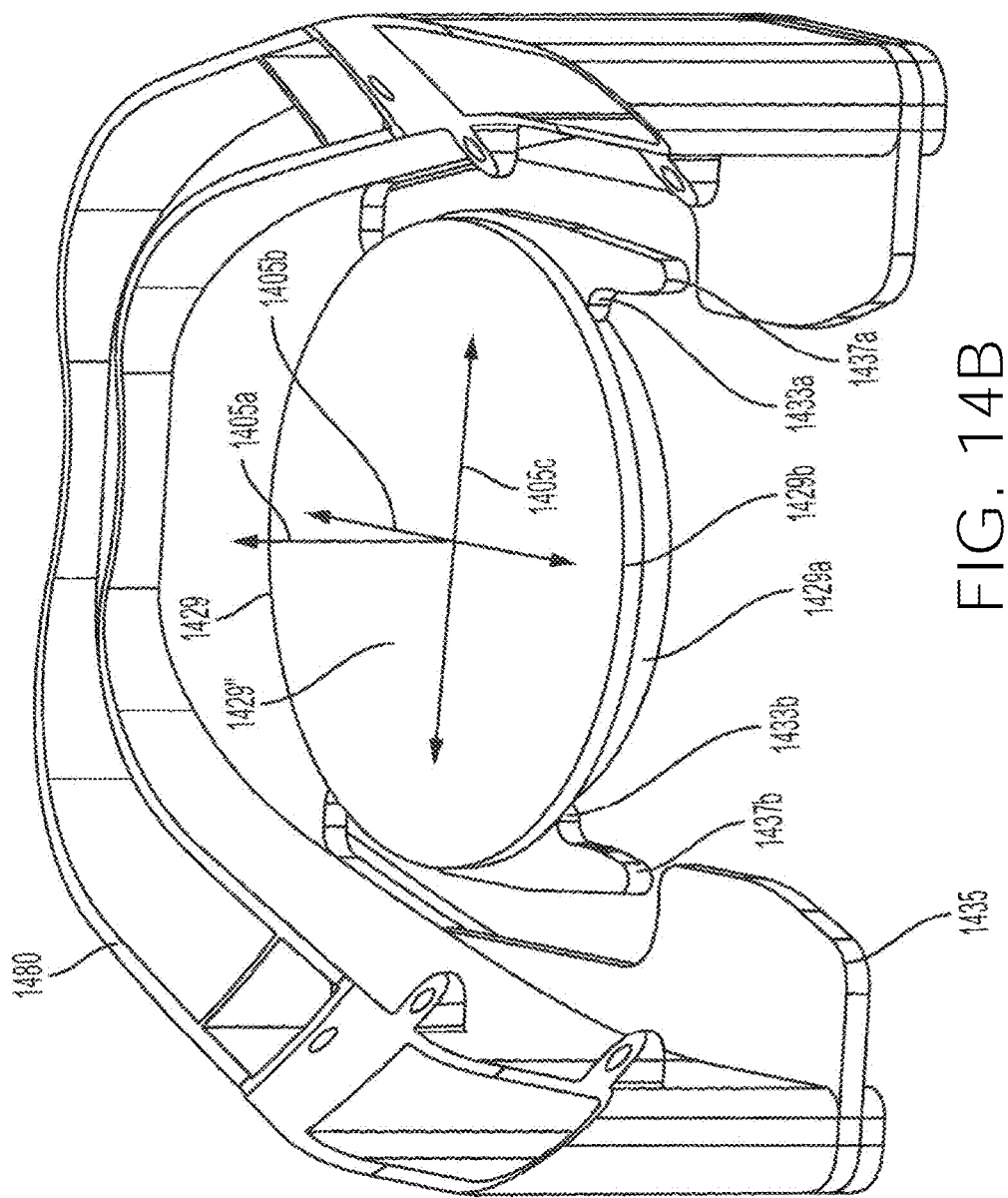

Releasable securing mechanism 1435 comprises a receptacle dimensioned to accommodate member 1429 and a retention portion 1437 configured to resist movement of the cooperating member 1429 once the member has been positioned within the receptacle, as shown in FIG. 14A. Exemplary retention portion 1437 comprises two arm portions 1437a and 1437b forming a portion of the receptacle and configured to grip member 1429 when member 1429 is positioned within the receptacle. According to some embodiments, arm portions 1437a and 1437b include protrusions 1433a and 1433b, respectively, configured to resist movement of member 1429 after it has been inserted into the receptacle of releasable securing mechanism 1435. Protrusions 1433a and 1433b comprise respective outward facing sides 1433a' and 1433b' and respective inward facing sides 1433a" and 1433b" dimensioned to facilitate engaging with member 1429 to secure the base to the MRI system. According to some embodiments, the angle of the outward facing sides of protrusions 1433a and 1433b and the angle of the inward facing sides of protrusions are configured such that less forced is required to allow member 1429 to enter into the receptacle of securing mechanism 1435 than to allow member 1429 to exit from the receptacle. For example, the relative angles of the outward and inward facing sides may be selected so that a relatively small force on the outward facing sides is needed to part arm portions 1437a and 1437b to allow member 1429 to enter the receptacle of releasable securing mechanism 1435 and a larger force on the inward facing sides is needed to part arm portion 1437a and 1437b to allow member 1429 to be released from the receptacle of securing mechanism 1435. It should be appreciated that protrusions 1433a and 1433b may be dimensioned in any way to achieve desired forces needed to engage and disengage member 1429 with securing mechanism 1435, as the aspects are not limited in this respect. Thus, a base of a flexible RF apparatus can be secured to and released from member 1429 by applying a force in the appropriate direction. That is, securing mechanism 1435 is releasable because after arm portions 1437a and 1437b grip member 1429, the grip can be released by providing sufficient force on the base so that member 1429 parts the arm portions 1437a and 1437b and releases the member.

As discussed above, the view in FIG. 14A is of the underside 1483b of the base of a flexible RF apparatus and member 1429 so that surface 1429' is visible. However, this surface is attached to the MRI system at a location so that when releasable mechanism 1435 is engaged with the member, the flexible RF apparatus and the target anatomy of the patient therein are positioned with the imaging region of the MRI system. FIG. 14B illustrates a top view of releasable securing mechanism 1435 engaged with member 1429 of an MRI system. As shown, arm portions 1437a and 1437b fit underneath larger diameter portion 1429b and protrusions 1433a and 1433b grip smaller diameter portion 1429a. In this manner, larger diameter portion 1429b prevents base 1480 from being lifted away from member 1429. That is, larger diameter portion 1429b restricts movement of base 1480 in the direction indicated by arrow 1405a. In addition, arms 1437a and 1437b restrict movement of base 1480 in the directions illustrated by arrows 1405b and 1405c (securing mechanism 1435 restricts movement of member 1429 in the plane of the top surface 1429" of member 1429). While the resistance to movement of base 1480 out of securing mechanism 1435 can be overcome by applying sufficient force to the base as discussed above, absent such a force, translational movement of base 1480 is generally prevented in all directions. However, releasable securing mechanism 1435 may be configured to allow radio frequency helmet to be rotated about member 1429 (e.g., about the axis along arrow 1405a). By allowing base 1480 this degree of freedom, a flexible RF coil apparatus can be oriented as desired about the center of the MRI system, providing flexibility as to the directions in which the patient can be inserted into the MRI system.

FIGS. 15A and 15B illustrate a system comprising a flexible RF coil apparatus and a low-field MRI system for which the RF coil apparatus is configured to operate, in accordance with some embodiments. In particular, the exemplary system in FIG. 15 comprises flexible RF coil apparatus 1550 adapted for imaging a patient's leg, for example, to obtain one or more images of a patient's knee. RF coil apparatus 1550 comprises flexible RF coil array component 1570 formed by providing an array of RF coils 1555 positioned between layers 1552a and 1552b of a flexible substrate, coupled to base 1580 comprising a housing 1587 for electronics of the apparatus and a platform 1583, the underside of which is provided with a releasable mechanism (not visible in FIG. 15) as discussed in connection with FIGS. 14A and 14B to allow the RF coil apparatus 1550 to be mechanically coupled to member 1529 of MRI system 1500. In particular, the releasable mechanism of base 1580 may be engaged with member 1529 so that patient anatomy around which flexible RF coil array component 1570 is wrapped and fastened (e.g., using buckle or snap fasteners 1517a-c illustrated in FIG. 15A or hook and loop fasteners 1517a-c' illustrated in FIG. 15B) is positioned with the imaging region between $B_0$ magnets 1510a and 1510b of MRI system 1500, as illustrated in FIG. 15B. As illustrated in FIGS. 15A and 15B, the flexible RF coil array component 1570 of the exemplary RF apparatus 1550 positions radio frequency coils around the full circumference when the flexible substrate is wrapped about the patient anatomy (e.g., the array of coils together cover the full circumference, or substantially the full circumference, of the target patient anatomy because any line from the proximal side to the distal side of the flexible substrate will pass through the interior of at least one RF coil in the array).

Figure 16:
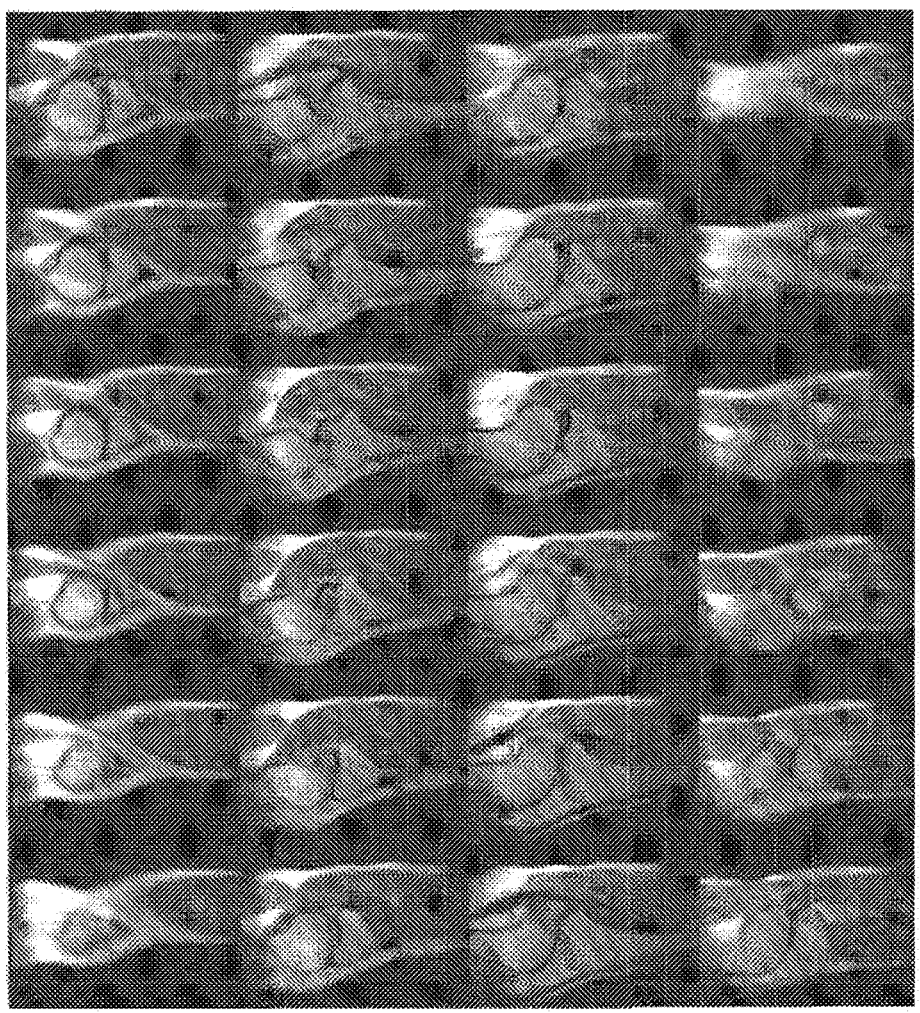
FIG. 16 illustrates magnetic resonance images acquired using exemplary flexible radio frequency coil apparatus and low-field magnetic resonance imaging systems described herein, in accordance with some embodiments.

FIG. 16 illustrates a series of MR images of the knee of a patient acquired using the exemplary flexible RF coil apparatus in conjunction with the exemplary low-field MRI systems described herein. Thus, the exemplary techniques and apparatus described herein may be used to obtain diagnostic MR images of patient anatomy.

Having thus described several aspects and embodiments of the technology set forth in the disclosure, it is to be appreciated that various alterations, modifications, and improvements will readily occur to those skilled in the art. Such alterations, modifications, and improvements are intended to be within the spirit and scope of the technology described herein. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The above-described embodiments can be implemented in any of numerous ways. One or more aspects and embodiments of the present disclosure involving the performance of processes or methods may utilize program instructions executable by a device (e.g., a computer, a processor, or other device such as a controller or console of an MRI device) to perform, or control performance of, the processes or methods. In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above. The computer readable medium or media can be transportable, such that the program or programs stored thereon can be loaded onto one or more different computers or other processors to implement various ones of the aspects described above. In some embodiments, computer readable media may be non-transitory media.

The terms "program" or "software" are used herein in a generic sense to refer to any type of computer code or set of computer-executable instructions that can be employed to program a computer or other processor to implement various aspects as described above. Additionally, it should be appreciated that according to one aspect, one or more computer programs that when executed perform methods of the present disclosure need not reside on a single computer or processor, but may be distributed in a modular fashion among a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as a controller that controls the above-discussed function. A controller can be implemented in numerous ways, such as with dedicated hardware, or with general purpose hardware (e.g., one or more processor) that is programmed using microcode or software to perform the functions recited above, and may be implemented in a combination of ways when the controller corresponds to multiple components of a system.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smartphone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible formats.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The invention claimed is:

1. A radio frequency apparatus configured to detect magnetic resonance signals emitted from anatomy of a patient when positioned within a low-field magnetic resonance imaging system, the radio frequency apparatus comprising:
   a flexible substrate capable of being positioned about the anatomy of the patient; and
   a plurality of radio frequency coils coupled to the flexible substrate, each of the plurality of radio frequency coils forming a plurality of turns, wherein each of the plurality of radio frequency coils comprises a conductor, each conductor being arranged in a plurality of turns, and wherein each conductor has a length between 100 and 1000 cm.

2. The radio frequency apparatus of claim 1, wherein the conductor of each of the plurality of radio frequency coils comprises between three and fifteen turns.

3. The radio frequency apparatus of claim 1, wherein the plurality of radio frequency coils comprises a plurality of proximal coils and a plurality of distal coils and each of the plurality of proximal coils is larger than each of the plurality of distal coils.

4. The radio frequency apparatus of claim 3, wherein the plurality of radio frequency coils further comprises a plurality of central coils positioned between the plurality of proximal coils and the plurality of distal coils.

5. The radio frequency apparatus of claim 4, wherein each of the plurality of central coils is larger than each of the plurality of proximal coils and each of the plurality of distal coils.

6. The radio frequency apparatus of claim 1, further comprising at least one fastener configured to hold the flexible substrate in place after it has been positioned about the anatomy of the patient.

7. The radio frequency apparatus of claim 1, wherein the flexible substrate comprises a plurality of layers including a first layer and a second layer, and wherein the plurality of radio frequency coils is coupled to the flexible substrate between the first layer and the second layer of the flexible substrate.

8. The radio frequency apparatus of claim 1, wherein the anatomy of the patient includes a knee.

9. A magnetic resonance imaging (MRI) system configured to image a patient positioned within the MRI system, the MRI system comprising:
   a $B_0$ magnet that produces a main magnetic $B_0$ field oriented along a vertical axis; and
   a radio frequency apparatus configured to detect magnetic resonance signals emitted from anatomy of a patient when positioned within the MRI system, the radio frequency apparatus comprising:
      a flexible substrate capable of being positioned about the anatomy of the patient; and
      a plurality of radio frequency coils coupled to the flexible substrate, each of the plurality of radio frequency coils including a conductor forming a plurality of turns and oriented such that, when the flexible substrate is positioned about the anatomy of the patient and placed within the main magnetic $B_0$ field, the plurality of radio frequency coils is configured to detect MR signals produced within the vertically oriented main magnetic $B_0$ field;
   wherein the MRI system operates with a B0 field strength between 0.2 T and 0.01 T, and wherein each of the plurality of radio frequency coils includes a conductor having a length between 100 and 1000 cm.

10. The MRI system of claim 9, further comprising a base coupled to the flexible substrate and configured to support the anatomy of the patient.

11. The MRI system of claim 10, wherein the base comprises a releasable securing mechanism configured to mechanically couple the base to a member attached to the MRI system at a location such that the releasable securing mechanism is coupled to the member, the radio frequency apparatus is substantially within an imaging region of the MRI system.

12. The MRI system of claim 10, wherein the base houses electronics configured to receive signals from the plurality of radio frequency coils.

13. The MRI system of claim 10, wherein the base comprises a valley portion configured to accommodate the anatomy being imaged, the valley formed by a pair of shoulders on respective sides of the base.

14. The MRI system of claim 10, wherein the base is rigid.

15. The MRI system of claim 9, wherein the flexible substrate comprises a first aperture through which each of the plurality of radio frequency coils passes through.

16. The MRI system of claim 15, further comprising a base coupled to the flexible substrate and configured to support the anatomy of the patient and house electronics for the plurality of radio frequency coils, wherein the base comprises a second aperture through which each of the plurality of radio frequency coils passes through to connect the plurality of radio frequency coils to the electronics housed by the base.

17. A magnetic resonance imaging (MRI) system configured to image a patient positioned within the MRI system, the MRI system comprising:
- a $B_0$ magnet that produces a main magnetic $B_0$ field;
- a first radio frequency apparatus comprising at least one radio frequency transmit coil; and
- a second radio frequency apparatus configured to detect magnetic resonance signals emitted from anatomy of a patient when positioned within the MRI system, the second radio frequency apparatus comprising:
  - a flexible substrate capable of being positioned about the anatomy of the patient; and
  - a plurality of radio frequency coils coupled to the flexible substrate, each of the plurality of radio frequency coils including a conductor forming a plurality of turns and oriented to detect MR signals produced within the main magnetic $B_0$ field;

wherein the MRI system operates with a B0 field strength between 0.2 T and 0.01 T, and wherein each of the plurality of radio frequency coils includes a conductor having a length between 100 and 1000 cm.

* * * * *